United States Patent
Wang

(10) Patent No.: US 7,752,126 B2
(45) Date of Patent: *Jul. 6, 2010

(54) COMPUTER-IMPLEMENTED METHOD AND COMPUTER-READABLE MEDIUM FOR ADJUSTMENT OF RISK AND ADJUSTMENT OF PARAMETERS AND UNCERTAINTY OF ANTICIPATED CONTRACT OBLIGATIONS IN WHICH STUDENT-T CUMULATIVE DISTRIBUTION IS APPLIED TO SHIFTED RESULTS TO CREATE TRANSFORMED CUMULATIVE PROBABILITY WEIGHTS

(76) Inventor: Shaun S. Wang, 828 Spring Valley Ct., Schaumburg, IL (US) 60193

( * ) Notice: Subject to any disclaimer, the term of this patent is extended or adjusted under 35 U.S.C. 154(b) by 0 days.

This patent is subject to a terminal disclaimer.

(21) Appl. No.: 11/928,985

(22) Filed: Oct. 30, 2007

(65) Prior Publication Data

US 2008/0147568 A1    Jun. 19, 2008

Related U.S. Application Data

(63) Continuation of application No. 09/923,377, filed on Aug. 6, 2001, now Pat. No. 7,315,842.

(51) Int. Cl.
*G06Q 40/00* (2006.01)
(52) U.S. Cl. .................................. 705/38; 705/35
(58) Field of Classification Search .................. 705/35, 705/38
See application file for complete search history.

(56) References Cited

U.S. PATENT DOCUMENTS

| | | | | |
|---|---|---|---|---|
| 6,055,517 A * | 4/2000 | Friend et al. | ............... | 705/36 R |
| 6,061,662 A * | 5/2000 | Makivic | ................... | 705/36 R |
| 6,360,210 B1 * | 3/2002 | Wallman | ................... | 705/36 R |

OTHER PUBLICATIONS

Wang, Shaun. "Insurance pricing and increased limits ratemaking by proportional hazards transforms". Insurance: Mathematics and Economics. 17 (1995) 43-54. (12 pages).*
Wang, Shaun S., "A Class of Distortion Operators for Pricing Financial and Insurance Risks," Journal of Risk and Insurance, 2000, pp. 15-36, vol. 67, No. 1.
Wang, Shaun, "Insurance Pricing and Increased Limits Ratemaking by Proportional Hazards Transforms," Insurance: Mathematics and Economics, 1995, pp. 43-54, vol. 17.

* cited by examiner

*Primary Examiner*—Jennifer Liversedge
(74) *Attorney, Agent, or Firm*—Vedder Price P.C.; W. Dennis Drehkoff

(57) ABSTRACT

The invention is a computer-implemented system and method, and a computer-readable medium for use with computer means, that enables portfolio managers to price, on a risk-adjusted basis, any traded or underwritten risk vehicle in finance and insurance that has a historically-known or computer-generated probability distribution. More importantly, the invention provides a universal approach to pricing assets and liabilities traded on an exchange or over-the-counter market, or underwritten for direct risk-transfer, even if those assets and liabilities are grouped or segregated, or whose prospective outcomes may alternate between positive or negative values.

42 Claims, 17 Drawing Sheets

Table 1.
Unsorted Intel Stock Price Distribution

| Column 1A | Column 1B | Column 1C | Column 1D step 203 | Column 1E step 203 |
|---|---|---|---|---|
| Monthly Index | Monthly Return | Current Price ($) | Prospective Future Stock Price Outcome | Respective Probability |
| Jun-00 | 0.03084 | 133.69 | 137.811 | 0.04167 |
| May-00 | 0.07014 | 133.69 | 143.065 | 0.04167 |
| Apr-00 | -0.08148 | 133.69 | 122.795 | 0.04167 |
| Mar-00 | 0.13985 | 133.69 | 152.385 | 0.04167 |
| Feb-00 | 0.14109 | 133.69 | 152.550 | 0.04167 |
| Jan-00 | 0.23234 | 133.69 | 164.750 | 0.04167 |
| Dec-99 | 0.07862 | 133.69 | 144.199 | 0.04167 |
| Nov-99 | 0.00412 | 133.69 | 134.239 | 0.04167 |
| Oct-99 | 0.01417 | 133.69 | 135.583 | 0.04167 |
| Sep-99 | -0.10187 | 133.69 | 120.069 | 0.04167 |
| Aug-99 | 0.14396 | 133.69 | 152.933 | 0.04167 |
| Jul-99 | 0.14863 | 133.69 | 153.558 | 0.04167 |
| Jun-99 | 0.25743 | 133.69 | 168.103 | 0.04167 |
| May-99 | -0.18136 | 133.69 | 109.442 | 0.04167 |
| Apr-99 | -0.03235 | 133.69 | 129.364 | 0.04167 |
| Mar-99 | 0.12458 | 133.69 | 150.342 | 0.04167 |
| Feb-99 | -0.15784 | 133.69 | 112.586 | 0.04167 |
| Jan-99 | 0.13549 | 133.69 | 151.801 | 0.04167 |
| Dec-98 | 0.03097 | 133.69 | 137.829 | 0.04167 |
| Nov-98 | 0.28941 | 133.69 | 172.379 | 0.04167 |
| Oct-98 | 0.06891 | 133.69 | 142.901 | 0.04167 |
| Sep-98 | 0.09787 | 133.69 | 146.772 | 0.04167 |
| Aug-98 | -0.10390 | 133.69 | 119.798 | 0.04167 |
| Jul-98 | 0.15784 | 133.69 | 154.790 | 0.04167 |
| Total | | | | 1.00000 |

Figure 7

Table 2.
Sorted Intel Stock Price Distribution

| Column 2A | Column 2B | Column 2C | Column 2D |
|---|---|---|---|
| | step 204 | step 204 | step 205 |
| Monthly Index | Prospective Future Stock Price Outcome ($) | Respective Probability | Cumulative Probability |
| | x | f(x) | F(x) |
| May-99 | 109.44 | 0.04167 | 0.04167 |
| Feb-99 | 112.59 | 0.04167 | 0.08333 |
| Aug-98 | 119.80 | 0.04167 | 0.12500 |
| Sep-99 | 120.07 | 0.04167 | 0.16667 |
| Apr-00 | 122.80 | 0.04167 | 0.20833 |
| Apr-99 | 129.36 | 0.04167 | 0.25000 |
| Nov-99 | 134.24 | 0.04167 | 0.29167 |
| Oct-99 | 135.58 | 0.04167 | 0.33333 |
| Jun-00 | 137.81 | 0.04167 | 0.37500 |
| Dec-98 | 137.83 | 0.04167 | 0.41667 |
| Oct-98 | 142.90 | 0.04167 | 0.45833 |
| May-00 | 143.06 | 0.04167 | 0.50000 |
| Dec-99 | 144.20 | 0.04167 | 0.54167 |
| Sep-98 | 146.77 | 0.04167 | 0.58333 |
| Mar-99 | 150.34 | 0.04167 | 0.62500 |
| Jan-99 | 151.80 | 0.04167 | 0.66667 |
| Mar-00 | 152.38 | 0.04167 | 0.70833 |
| Feb-00 | 152.55 | 0.04167 | 0.75000 |
| Aug-99 | 152.93 | 0.04167 | 0.79167 |
| Jul-99 | 153.56 | 0.04167 | 0.83333 |
| Jul-98 | 154.79 | 0.04167 | 0.87500 |
| Jan-00 | 164.75 | 0.04167 | 0.91667 |
| Jun-99 | 168.10 | 0.04167 | 0.95833 |
| Nov-98 | 172.38 | 0.04167 | 1.00000 |
| Total | | 1.00000 | |

Figure 8

Table 3.
Kernel, or Core Process, of the Wang Transform (Lambda=0.4525)

| Column 2B | Column 2D | Column 3A | Column 3B | Column 3C |
|---|---|---|---|---|
| step 102 | step 102 | step 103 | step 104 | step 105 |
| Prospective Future Stock Price Outcome ($) | Cumulative Probability... | ... After Applying Normal Inversion | ... After Shifting By Adding Lambda | ... After Applying Normal Distribution |
| x | F(x) | | | |
| 109.44 | 0.04167 | -1.7317 | -1.2791 | 0.10043 |
| 112.59 | 0.08333 | -1.3830 | -0.9305 | 0.17607 |
| 119.80 | 0.12500 | -1.1503 | -0.6978 | 0.24265 |
| 120.07 | 0.16667 | -0.9674 | -0.5149 | 0.30332 |
| 122.80 | 0.20833 | -0.8122 | -0.3597 | 0.35954 |
| 129.36 | 0.25000 | -0.6745 | -0.2220 | 0.41217 |
| 134.24 | 0.29167 | -0.5485 | -0.0960 | 0.46176 |
| 135.58 | 0.33333 | -0.4307 | 0.0218 | 0.50870 |
| 137.81 | 0.37500 | -0.3186 | 0.1339 | 0.55326 |
| 137.83 | 0.41667 | -0.2104 | 0.2421 | 0.59565 |
| 142.90 | 0.45833 | -0.1046 | 0.3479 | 0.63604 |
| 143.06 | 0.50000 | 0.0000 | 0.4525 | 0.67456 |
| 144.20 | 0.54167 | 0.1046 | 0.5572 | 0.71129 |
| 146.77 | 0.58333 | 0.2104 | 0.6630 | 0.74632 |
| 150.34 | 0.62500 | 0.3186 | 0.7712 | 0.77970 |
| 151.80 | 0.66667 | 0.4307 | 0.8833 | 0.81145 |
| 152.38 | 0.70833 | 0.5485 | 1.0011 | 0.84160 |
| 152.55 | 0.75000 | 0.6745 | 1.1270 | 0.87013 |
| 152.93 | 0.79167 | 0.8122 | 1.2648 | 0.89702 |
| 153.56 | 0.83333 | 0.9674 | 1.4200 | 0.92219 |
| 154.79 | 0.87500 | 1.1503 | 1.6029 | 0.94552 |
| 164.75 | 0.91667 | 1.3830 | 1.8355 | 0.96679 |
| 168.10 | 0.95833 | 1.7317 | 2.1842 | 0.98553 |
| 172.38 | 1.00000 | 500000.0000 | 500000.4525 | 1.00000 |

Figure 9

Table 4.
Wang Price of the Future Intel Stock in One Month (Lambda=0.4525)

| Column 3B | Column 3C | Column 4A | Column 4B |
|---|---|---|---|
| | step 207 | step 208 | step 209 |
| Prospective Future Stock-Price Outcome | After Wang Transform | After Decumulation | After Multiplication To Each Outcome |
| | Transformed Probability | Distorted Probability | Weighted Value |
| x | F*(x) | f*(x) | f*(x) · x |
| 109.44 | 0.10042 | 0.10042 | 10.990 |
| 112.59 | 0.17606 | 0.07564 | 8.516 |
| 119.80 | 0.24264 | 0.06658 | 7.976 |
| 120.07 | 0.30330 | 0.06067 | 7.284 |
| 122.80 | 0.35953 | 0.05622 | 6.904 |
| 129.36 | 0.41216 | 0.05263 | 6.809 |
| 134.24 | 0.46175 | 0.04959 | 6.657 |
| 135.58 | 0.50869 | 0.04693 | 6.363 |
| 137.81 | 0.55324 | 0.04456 | 6.141 |
| 137.83 | 0.59564 | 0.04239 | 5.843 |
| 142.90 | 0.63603 | 0.04039 | 5.772 |
| 143.06 | 0.67455 | 0.03852 | 5.510 |
| 144.20 | 0.71128 | 0.03674 | 5.297 |
| 146.77 | 0.74631 | 0.03503 | 5.141 |
| 150.34 | 0.77969 | 0.03338 | 5.018 |
| 151.80 | 0.81144 | 0.03176 | 4.821 |
| 152.38 | 0.84159 | 0.03015 | 4.594 |
| 152.55 | 0.87013 | 0.02853 | 4.353 |
| 152.93 | 0.89701 | 0.02689 | 4.112 |
| 153.56 | 0.92218 | 0.02517 | 3.865 |
| 154.79 | 0.94552 | 0.02333 | 3.611 |
| 164.75 | 0.96678 | 0.02127 | 3.504 |
| 168.10 | 0.98552 | 0.01874 | 3.150 |
| 172.38 | 1.00000 | 0.01448 | 2.495 |
| Total | | 1.0000 | $ 134.73 |
| | | | step 210 |
| | | | $ 133.94 |
| | | | step 211 |

Figure 10

Table 5.
Wang Price of a European Call Option on Intel Stock with a Strike Price of 140 (Lambda=0.4685)

| Column 2B | Column 2D | Column 5A | Column 5B | Column 5C | Column 5D | Column 5E |
|---|---|---|---|---|---|---|
| | | step 307 | step 308 | step 309 | step 315 | step 316 |
| Prospective Future Stock Price Outcome ($) | Cumulative Probability | After Wang Transform | After Decumulation, Distorted Probability Weight | Weighted Value For Underlying ($) | Contingent Payoff For Option ($) | Weighted Value For Option ($) |
| $x$ | $F(x)$ | $F^*(x)$ | $f^*(x)$ | $x \cdot f^*(x)$ | $=\max(x-140,0)$ | $f^*(x) \cdot V(x)$ |
| 109.44 | 0.0417 | 0.1033 | 0.1033 | 11.302 | 0.00 | 0.000 |
| 112.59 | 0.0833 | 0.1802 | 0.0770 | 8.665 | 0.00 | 0.000 |
| 119.80 | 0.1250 | 0.2477 | 0.0674 | 8.079 | 0.00 | 0.000 |
| 120.07 | 0.1667 | 0.3089 | 0.0613 | 7.354 | 0.00 | 0.000 |
| 122.80 | 0.2083 | 0.3655 | 0.0566 | 6.952 | 0.00 | 0.000 |
| 129.36 | 0.2500 | 0.4184 | 0.0529 | 6.839 | 0.00 | 0.000 |
| 134.24 | 0.2917 | 0.4681 | 0.0497 | 6.673 | 0.00 | 0.000 |
| 135.58 | 0.3333 | 0.5151 | 0.0470 | 6.366 | 0.00 | 0.000 |
| 137.81 | 0.3750 | 0.5596 | 0.0445 | 6.132 | 0.00 | 0.000 |
| 137.83 | 0.4167 | 0.6018 | 0.0423 | 5.825 | 0.00 | 0.000 |
| 142.90 | 0.4583 | 0.6420 | 0.0402 | 5.744 | 2.90 | 0.117 |
| 143.06 | 0.5000 | 0.6803 | 0.0383 | 5.474 | 3.06 | 0.117 |
| 144.20 | 0.5417 | 0.7167 | 0.0364 | 5.254 | 4.20 | 0.153 |
| 146.77 | 0.5833 | 0.7514 | 0.0347 | 5.091 | 6.77 | 0.235 |
| 150.34 | 0.6250 | 0.7844 | 0.0330 | 4.960 | 10.34 | 0.341 |
| 151.80 | 0.6667 | 0.8157 | 0.0313 | 4.757 | 11.80 | 0.370 |
| 152.38 | 0.7083 | 0.8454 | 0.0297 | 4.525 | 12.38 | 0.368 |
| 152.55 | 0.7500 | 0.8735 | 0.0281 | 4.279 | 12.55 | 0.352 |
| 152.93 | 0.7917 | 0.8999 | 0.0264 | 4.034 | 12.93 | 0.341 |
| 153.56 | 0.8333 | 0.9245 | 0.0246 | 3.783 | 13.56 | 0.334 |
| 154.79 | 0.8750 | 0.9473 | 0.0228 | 3.525 | 14.79 | 0.337 |
| 164.75 | 0.9167 | 0.9680 | 0.0207 | 3.409 | 24.75 | 0.512 |
| 168.10 | 0.9583 | 0.9861 | 0.0182 | 3.051 | 28.10 | 0.510 |
| 172.38 | 1.0000 | 1.0000 | 0.0139 | 2.396 | 32.38 | 0.450 |
| Total | | | 1.0000 | $134.47 | | $ 4.54 |
| | | | | step 310 | | step 317 |
| | | | | $133.69 | | $ 4.51 |
| | | | | step 311 | | step 318 |

Figure 11

Table 6.
Wang Price for the Underlying (Lambda=0.0854)

| Column 6A | Column 6B | Column 6C | Column 6D | Column 6E | Column 6F |
|---|---|---|---|---|---|
| step 304 | step 304 | step 305 | step 307 | step 308 | step 309 |
| Sorted Outcome ($) | Assigned Probability | Cumulative Probability | After Wang Transform | Distorted Probability | Weighted Payoff ($) |
| x | f(x) | F(x) | F*(x) | f*(x) | f*(x) · x |
| $ (123.00) | 0.1 | 0.1 | 0.1158 | 0.1158 | $ (14.25) |
| $ (21.00) | 0.1 | 0.2 | 0.2248 | 0.1089 | $ (2.29) |
| $ (9.00) | 0.1 | 0.3 | 0.3303 | 0.1056 | $ (0.95) |
| $ 7.00 | 0.1 | 0.4 | 0.4333 | 0.1030 | $ 0.72 |
| $ 20.00 | 0.1 | 0.5 | 0.5340 | 0.1007 | $ 2.01 |
| $ 20.00 | 0.1 | 0.6 | 0.6326 | 0.0986 | $ 1.97 |
| $ 28.00 | 0.1 | 0.7 | 0.7290 | 0.0964 | $ 2.70 |
| $ 36.00 | 0.1 | 0.8 | 0.8230 | 0.0940 | $ 3.39 |
| $ 50.00 | 0.1 | 0.9 | 0.9142 | 0.0911 | $ 4.56 |
| $ 57.00 | 0.1 | 1.0 | 1.0000 | 0.0858 | $ 4.89 |
| Total | 1.0000 | | | 1.0000 | $ 2.76 |
| | | | | | step 311 |
| | | | | | $ 2.58 |
| | | | | | step 312 |

Figure 12

Table 7.
Wang Price for the Put Option with a Strike Price of 0.00 (Lambda=0.10)

| Column 6A | Column 6C | Column 7A | Column 7B | Column 7C | Column 7D | Column 7E |
|---|---|---|---|---|---|---|
| | | step 307 | step 308 | step 309 | step 315 | step 316 |
| Sorted Outcome ($) | Cumulative Probability | Wang Transform | Distorted Probability | Weighted Value ($) | Contingent Payoff ($) | Weighted Payoff ($) |
| x | F(x) | F*(x) | f*(x) | x · f*(x) | =max(-x,0) | f*(x) · V(x) |
| $ (123.00) | 0.1000 | 0.1187 | 0.1187 | $ (14.599) | $ 123.00 | $ 14.60 |
| $ (21.00) | 0.2000 | 0.2292 | 0.1105 | $ (2.320) | $ 21.00 | $ 2.32 |
| $ (9.00) | 0.3000 | 0.3356 | 0.1065 | $ (0.958) | $ 9.00 | $ 0.96 |
| $ 7.00 | 0.4000 | 0.4391 | 0.1034 | $ 0.724 | $ - | $ - |
| $ 20.00 | 0.5000 | 0.5398 | 0.1008 | $ 2.015 | $ - | $ - |
| $ 20.00 | 0.6000 | 0.6381 | 0.0983 | $ 1.965 | $ - | $ - |
| $ 28.00 | 0.7000 | 0.7338 | 0.0957 | $ 2.681 | $ - | $ - |
| $ 36.00 | 0.8000 | 0.8268 | 0.0930 | $ 3.348 | $ - | $ - |
| $ 50.00 | 0.9000 | 0.9164 | 0.0896 | $ 4.482 | $ - | $ - |
| $ 57.00 | 1.0000 | 1.0000 | 0.0836 | $ 4.763 | $ - | $ - |
| Total | | | 1.0000 | $ 2.10 | | $ 17.88 |
| | | | | step 310 | | step 317 |
| | | | | $ 1.96 | | $ 16.71 |
| | | | | step 311 | | step 318 |

Figure 13

Table 8.
Rating Migration for a BBB-rated Bond over 1 Year

| Column 8A | Column 8B | Column 8C | Column 8D | Column 8E |
|---|---|---|---|---|
| | | | step 403 | step 403 |
| Year-end Rating | Coupon Rate | Forward Value | Total Value ($) | Estimated Probability |
| AAA | 6% | 103.37 | 109.37 | 0.020% |
| AA | 6% | 103.1 | 109.19 | 0.330% |
| A | 6% | 102.66 | 108.66 | 5.950% |
| BBB | 6% | 101.55 | 107.55 | 86.930% |
| BB | 6% | 96.02 | 102.02 | 5.300% |
| B | 6% | 92.1 | 98.10 | 1.170% |
| CCC | 6% | 77.64 | 83.64 | 0.120% |
| Default | 0% | 51.13 | 51.13 | 0.180% |
| Total | | | | 100.000% |

Figure 14

Table 9. Wang Price of the BBB-bond (Lambda=0.698)

| Column 9A | Column 9B | Column 9C | Column 9D | Column 9E | Column 9F | Column 9G |
|---|---|---|---|---|---|---|
| step 404 | step 404 | step 405 | step 407 | step 408 | step 409 | step 410 |
| Total Value In 1 Year | Estimated Probability | Cumulative Probability | After Wang Transform | Distorted Probability | Apply Payoff ($) | Weighted Value ($) |
| x | f(x) | F(x) | F*(x) | f*(x) | −x | v(x) · f*(x) |
| 51.13 | 0.00180 | 0.0018 | 0.0134 | 0.01344 | 51.130 | 0.687 |
| 83.64 | 0.00120 | 0.0030 | 0.0202 | 0.00675 | 83.640 | 0.565 |
| 98.10 | 0.01170 | 0.0147 | 0.0694 | 0.04923 | 98.100 | 4.830 |
| 102.02 | 0.05300 | 0.0677 | 0.2133 | 0.14384 | 102.020 | 14.674 |
| 107.55 | 0.86930 | 0.9370 | 0.9871 | 0.77380 | 107.550 | 83.222 |
| 108.66 | 0.05950 | 0.9965 | 0.9997 | 0.01259 | 108.660 | 1.369 |
| 109.19 | 0.00330 | 0.9998 | 1.0000 | 0.00033 | 109.190 | 0.036 |
| 109.37 | 0.00020 | 1.0000 | 1.0000 | 0.00001 | 109.370 | 0.001 |
| Total | 1.00000 | | | 1.00000 | | $ 105.38 |
| | | | | | | step 411 |
| | | | | | | $ 100.37 |
| | | | | | | step 412 |

Figure 15

Table 10.
Estimation of True Market Price of Risk (Lambda=0.788)

| Column 9A | Column 9C | Column 10A | Column 10B | Column 10C | Column 10D |
|---|---|---|---|---|---|
| | step 405 | step 407 | step 408 | step 409 | step 410 |
| Total Value | Cumulative | After Wang | Distorted | Contingent | Weighted |
| In 1 Year ($) | Probability | Transform | Probability | Payoff ($) | Value ($) |
| $x$ | $F(x)$ | $F^*(x)$ | $f^*(x)$ | $\sim x$ | $v(x) \cdot f^*(x)$ |
| 51.13 | 0.00180 | 0.0169 | 0.01687 | 51.130 | 0.862 |
| 83.64 | 0.00300 | 0.0250 | 0.00815 | 83.640 | 0.681 |
| 98.10 | 0.01470 | 0.0823 | 0.05724 | 98.100 | 5.615 |
| 102.02 | 0.06770 | 0.2404 | 0.15811 | 102.020 | 16.130 |
| 107.55 | 0.93700 | 0.9898 | 0.74942 | 107.550 | 80.600 |
| 108.66 | 0.99650 | 0.9998 | 0.00998 | 108.660 | 1.084 |
| 109.19 | 0.99980 | 1.0000 | 0.00024 | 109.190 | 0.026 |
| 109.37 | 1.00000 | 1.0000 | 0.00001 | 109.370 | 0.001 |
| Total | | | 1.00000 | | $ 105.00 |
| | | | | | step 411 |
| | | | | | $ 100.00 |
| | | | | | step 412 |

Figure 16

Table 11.
Estimated Probability Distribution for Earthquake Payoff

| Column 11A | Column 11B | Column 11C |
|---|---|---|
| | step 503 | step 503 |
| Richter | Payout | Estimated |
| Scale | Amount ($) | Probability |
| | $x$ | $f(x)$ |
| 0-5.9 | $ - | 0.80000 |
| 6.0 | $ 100.00 | 0.02000 |
| 6.1 | $ 110.52 | 0.01800 |
| 6.2 | $ 122.14 | 0.01620 |
| 6.3 | $ 134.99 | 0.01458 |
| 6.4 | $ 149.18 | 0.01312 |
| 6.5 | $ 164.87 | 0.01181 |
| 6.6 | $ 182.21 | 0.01063 |
| 6.7 | $ 201.38 | 0.00957 |
| 6.8 | $ 222.55 | 0.00861 |
| 6.9 | $ 245.96 | 0.00775 |
| 7+ | $ 271.83 | 0.06974 |
| Total | | 1.00000 |

Figure 17

Table 12.
Wang Price for the Earthquake Insurance (lambda=0.3)

| Column 12A | Column 12B | Column 12C | Column 12D | Column 12E | Column 12F |
|---|---|---|---|---|---|
| step 504 | step 504 | step 505 | step 507 | step 508 | step 509 |
| Payout Amount ($) | Estimated Probability | Cumulative Probability | After Wang Transform | Distorted Probability | Weighted Payoff ($) |
| $x$ | $f(x)$ | $F(x)$ | $F^*(x)$ | $f^*(x)$ | $x \cdot f^*(x)$ |
| $ -  | 0.80000 | 0.80000 | 0.7060 | 0.7060 | $ - |
| $ 100.00 | 0.02000 | 0.82000 | 0.7308 | 0.0249 | $ 2.49 |
| $ 110.52 | 0.01800 | 0.83800 | 0.7537 | 0.0229 | $ 2.53 |
| $ 122.14 | 0.01620 | 0.85420 | 0.7748 | 0.0210 | $ 2.57 |
| $ 134.99 | 0.01458 | 0.86878 | 0.7941 | 0.0193 | $ 2.61 |
| $ 149.18 | 0.01312 | 0.88190 | 0.8118 | 0.0177 | $ 2.64 |
| $ 164.87 | 0.01181 | 0.89371 | 0.8281 | 0.0163 | $ 2.68 |
| $ 182.21 | 0.01063 | 0.90434 | 0.8430 | 0.0149 | $ 2.72 |
| $ 201.38 | 0.00957 | 0.91391 | 0.8566 | 0.0137 | $ 2.75 |
| $ 222.55 | 0.00861 | 0.92252 | 0.8691 | 0.0125 | $ 2.78 |
| $ 245.96 | 0.00775 | 0.93026 | 0.8806 | 0.0114 | $ 2.81 |
| $ 271.83 | 0.06974 | 1.00000 | 1.0000 | 0.1194 | $ 32.47 |
| Total | 1.00000 | | | 1.00000 | $ 59.05 |
| | | | | | step 511 |
| | | | | | $ 55.18 |
| | | | | | step 512 |

Figure 18

Table 13.
Wang Price of the Contingent Payoff on the Earthquake Insurance

| Column 12A | Column 12E | Column 13A | Column 13B |
|---|---|---|---|
| step 504 | step 508 | step 515 | step 516 |
| Payout Amount ($) | Distorted Probability | Contingent Payoff ($) | Weighted Payoff ($) |
| $x$ | $f^*(x)$ | $=\max(x-200,0)$ | $V(x) \cdot f^*(x)$ |
| $ - | 0.7060 | $ - | $ - |
| $ 100.00 | 0.0249 | $ - | $ - |
| $ 110.52 | 0.0229 | $ - | $ - |
| $ 122.14 | 0.0210 | $ - | $ - |
| $ 134.99 | 0.0193 | $ - | $ - |
| $ 149.18 | 0.0177 | $ - | $ - |
| $ 164.87 | 0.0163 | $ - | $ - |
| $ 182.21 | 0.0149 | $ - | $ - |
| $ 201.38 | 0.0137 | $ 1.38 | $ 0.02 |
| $ 222.55 | 0.0125 | $ 22.55 | $ 0.28 |
| $ 245.96 | 0.0114 | $ 45.96 | $ 0.53 |
| $ 271.83 | 0.1194 | $ 71.83 | $ 8.58 |
| Total | 1.00000 | | $ 9.41 |
| | | | step 517 |
| | | | $ 8.79 |
| | | | step 518 |

Figure 19

Table 14.
A Variation of Table 12, Using Exceedance Probabilities

| Column 12A | Column 12B | New Column 12C | New Column 12D | Column 12E | Column 12F |
|---|---|---|---|---|---|
| step 504 | step 504 | step 505_new | step 507_new | step 508_new | step 509 |
| Payout Amount ($) x | Estimated Probability f(x) | Exceedance Probability G(x) | After Wang Transform G*(x) | Distorted Probability f*(x) | Weighted Payoff ($) x f*(x) |
| $ - | 0.80000 | 0.20000 | 0.2940 | 0.7060 | $ - |
| $ 100.00 | 0.02000 | 0.18000 | 0.2692 | 0.0249 | $ 2.49 |
| $ 110.52 | 0.01800 | 0.16200 | 0.2463 | 0.0229 | $ 2.53 |
| $ 122.14 | 0.01620 | 0.14580 | 0.2252 | 0.0210 | $ 2.57 |
| $ 134.99 | 0.01458 | 0.13122 | 0.2059 | 0.0193 | $ 2.61 |
| $ 149.18 | 0.01312 | 0.11810 | 0.1882 | 0.0177 | $ 2.64 |
| $ 164.87 | 0.01181 | 0.10629 | 0.1719 | 0.0163 | $ 2.68 |
| $ 182.21 | 0.01063 | 0.09566 | 0.1570 | 0.0149 | $ 2.72 |
| $ 201.38 | 0.00957 | 0.08609 | 0.1434 | 0.0137 | $ 2.75 |
| $ 222.55 | 0.00861 | 0.07748 | 0.1309 | 0.0125 | $ 2.78 |
| $ 245.96 | 0.00775 | 0.06974 | 0.1194 | 0.0114 | $ 2.81 |
| $ 271.83 | 0.06974 | 0.00000 | 0.0000 | 0.1194 | $ 32.47 |
| Total | 1.00000 | | | 1.00000 | $ 59.05 |
| | | | | | step 511 |
| | | | | | $ 55.18 |
| | | | | | step 512 |

Figure 20

Table 15.
An Insurance Policy Covering the Total Loss of a Satellite Launch (Lambda = -0.2, Degrees of Freedom = 11)

| Column 15A | Column 15B | Column 15C | Column 15D | Column 15E | Column 15F |
|---|---|---|---|---|---|
| | | | Steps 601-606 | | |
| Loss Amount | Estimated Probability | Cumulative Probability | After Two-Factor Wang Transform | Distorted Probability | Weighted Value |
| x | f(x) | F(x) | F*(x) | f*(x) | x f*(x) |
| $ - | 0.96000 | 0.96000 | 0.9254 | 0.9254 | $ |
| $ 200.00 mil | 0.04000 | 1.00000 | 1.0000 | 0.0746 | $ 14.93 mil |
| Total | 1.00000 | | | 1.00000 | $ 14.93 mil |
| | | | | | Price |

Figure 21

COMPUTER-IMPLEMENTED METHOD AND COMPUTER-READABLE MEDIUM FOR ADJUSTMENT OF RISK AND ADJUSTMENT OF PARAMETERS AND UNCERTAINTY OF ANTICIPATED CONTRACT OBLIGATIONS IN WHICH STUDENT-T CUMULATIVE DISTRIBUTION IS APPLIED TO SHIFTED RESULTS TO CREATE TRANSFORMED CUMULATIVE PROBABILITY WEIGHTS

This application is a divisional application of U.S. patent application Ser. No. 09/923,377, filed Aug. 6, 2001 now U.S. Pat. No. 7,315,842.

FIELD OF THE INVENTION

The invention provides a universal approach to pricing assets and liabilities, whether traded on an exchange or over-the-counter market, or underwritten for direct risk-transfer, whether grouped or segregated, or even positive or negative in value. More particularly, it relates to a computer-implemented system and method, and a computer-readable medium for use with a computer means, for pricing financial and insurance risks with historically-known or computer-generated probability distributions. The method can also be used to quantify the uncertainty of a variable within any historically-known of computer-generated distribution of outcomes. The invention can also be used to objectively assess the relative value of traded portfolios, and to assist the underwriting selection of managed accounts.

BACKGROUND OF THE INVENTION

An economic enterprise, particularly a financial firm, insurance company, or government agency, often faces uncertainty in the future financial value of its assets and liabilities. These assets and liabilities can be brought to the enterprise via financial trading, or via financial or insurance underwriting, and then managed within a portfolio. In the prior art, the uncertainty of these assets and liabilities were evaluated differently, based on whether they were traded financial instruments, in a trading risk management environment, or, based on whether they were underwritten financial obligations, in an underwriting risk environment.

Pricing of Assets and Liabilities within a Trading Environment

When assets and liabilities are managed within a trading environment, such as where stocks, bonds, currencies, commodities, or other financial instruments are exchanged, uncertainty can be expressed as a probability distribution of potential future market prices. For each instrument, a probability distribution assigns a probability to each potential future price, as a potential outcome. Some outcomes increase, and others decrease, the future value of a portfolio that holds, and trades, these financial instruments.

For example, a mutual fund trader faces uncertainties in a stock portfolio because of volatilities in the underlying stock price. A municipal bond issuer from city government faces uncertainties in risk-free interest rates. A corporate treasurer faces uncertainties in strike prices for options issued to employees. A farmer faces uncertainties in soybean commodity futures prices before harvest time.

For each trading portfolio, a probability distribution of future prices can be assigned to each individual instrument, or, to any grouping of instruments, or, to the entire portfolio of instruments. The shape, skew, and other aspects of this probability distribution are fitted to historical records of past price movements for those instruments. This "fitted distribution" can then be used in quantitative models to anticipate future price movements.

Historical data for the price changes of stocks, bonds, currencies, commodities, and other financial instruments can be fitted to different kinds of probability distributions. These include parametric distributions generated by a simple mathematical function, such as normal, lognormal, gamma, Weibull, and Pareto distributions, and non-parametric distributions generated from a set of mathematical values, like those known from historical tables, or those generated from computer simulations.

In the prior art, computer-implemented systems and methods, and computer-readable media for use with computer means, for pricing financial instruments, were deficient because they could not accurately price, in a risk-neutral way, the vast majority of financial instruments whose price changes did not fit normal or lognormal probability distributions.

Pricing of Assets and Liabilities within an Underwriting Environment

Assets and liabilities can be managed within an underwriting environment, where, for example, credit, health care, pension, insurance, and other risks are assumed. Uncertainty can be expressed as a probability distribution of anticipated contract obligations. A probability distribution assigns a probability to each contract obligation, as an outcome. Some outcomes increase, and others decrease, the future value of a portfolio holding these obligations.

For example, a credit card issuer faces uncertainties because of customer delinquencies, defaults, renewals, prepayments, and fluctuations in outstanding balances. A utility company faces uncertainties in energy demand during extreme weather conditions. A hospital faces uncertainties in patient receivables. An insurance company faces uncertainties in premium receptions and claim payments. A reinsurer faces uncertainties of paying for hurricane and earthquake damages. A pension plan faces uncertainties of prolonged life expectancy.

For each underwritten portfolio, a probability distribution of anticipated obligations can be assigned to each individual contract, or to any collection of contracts, or to the entire portfolio of contracts. A parametric probability distribution can be fitted to historical records of past experience for those contract obligations. This "fitted distribution" can then be used in quantitative models to anticipate future contract obligations.

Historical data for contract obligations in credit, health care, pension, insurance, and other underwritten risks have been fitted to different kinds of probability distributions. These include parametric distributions generated by a simple mathematical function, such as normal, lognormal, gamma, Weibull, and Pareto distributions, and non-parametric distributions generated from a set of mathematical values, like those known from historical tables, or those generated from computer simulations.

In the prior art, computer-implemented systems and methods, and computer-readable media for use with computer means, were deficient because they could not accurately price, in a risk-neutral way, the vast majority of underwritten contract obligations whose cashflow outcomes did not fit normal or lognormal probability distributions. This was true even when portfolios were expressly underwritten for immediate transfer to another counterparty by true sale, trade, or even reinsurance.

Pricing of Underlying Risk Vehicles, Regardless of Whether they Consist of Assets or Liabilities, Traded or Underwritten In the prior art, computer-implemented systems and methods, and computer-readable media for use with computer means, were deficient because they could not accurately price, in a risk-neutral way, the vast majority of financial instruments whose price changes did not fit normal or lognormal probability distributions.

Before this invention, computer-implemented systems and methods, and computer-readable media for use with computer means, were deficient because they could not accurately price, in a risk-neutral way, any managed portfolio of assets and liabilities whose entirety or parts were drifting from positive to negative value, or, from negative to positive value, over time.

With the explosion in computer applications, reams of historical data for financial instruments and contract obligations can now be gathered and processed instantly. Many computer simulation models can generate a sample distribution of possible outcomes for these traded and underwritten portfolios. For example, a derivative modeling firm can anticipate a price distribution for an underlying stock for a financial option. A catastrophe-modeling firm can anticipate a loss distribution for a geographic area after a simulated hurricane or earthquake.

Yet, with the increased availability of historically-known or computer-generated data, there is no accurate method for pricing the underlying risk, except in two special cases, applicable only to rare instances of probability distributions.

The first special case is the well-known Capital Asset Pricing Model, or CAPM, which relates the expected rate of return to the standard deviation of the rate of return. A standard assumption underlying the CAPM is that asset price movements have lognormal distributions, or, equivalently, that the rates of return for those asset price movements have normal distributions. The CAPM approach is deficient, however, when the historical asset returns do not have normal distributions.

The second special case is the Nobel Prize winning Black-Scholes formula for pricing options. Financial trading and insurance underwriting researchers have noted the similarity in the payoff function between a financial option and a stop-loss insurance cover. Again, a standard assumption underlying the Black-Scholes formula is that asset price movements have normal or lognormal distributions. Again, the Black-Scholes approach is deficient since the historical price movements of most capital assets do not have lognormal distributions.

To summarize, the historical data for traded and underwritten outcomes for assets and liabilities rarely resembles a normal or lognormal distribution. Most of the historical data fits other types of probability distributions. Most of the real-world traded and underwritten outcomes therefore cannot be effectively priced in a risk-neutral way by current valuation models, including those based on CAPM, Black-Scholes, or other implementations of modern options pricing theory.

There is a demand for a computer-implemented system and method, and a computer-readable medium for use with computer means, to effectively price all kinds of assets and liabilities, whether traded or underwritten, grouped or segregated, mixed or homogenized, in various and sundry ways, and whose probability distributions of uncertain outcomes, for any positive or negative values, at any level of detail, may be fitted, to any parametric type, including, but not limited to, normal, lognormal, gamma, Weibull, and Pareto distributions, as well as any nonparametric type, generated from any set of mathematical values, like from a computer.

In the United States in particular, the deregulation of banking, securities, and insurance, will encourage the integration of different portfolios of assets and liabilities, requiring such a unified approach.

GLOSSARY

Adjustment for Risk

Risk refers to potential deviations of cashflow outcome from an expected mean value. An asset is defined as having a positive expected mean value. When evaluating a fair value for an asset, a prudent individual adjusts an asset for risk by inflating the probability for the worst outcomes and deflating the probability for the best outcomes. With adjusted new probabilities, the probability-weighted positive value for the asset is reduced.

A liability is defined as having a negative expected mean value. When evaluating a fair value for a liability, a prudent individual adjusts a liability for risk by inflating the probability for the largest losses and deflating the probability for the lowest losses. With adjusted new probabilities, the probability-weighted negative value for the liability is increased.

Catastrophe Bond

A bond whose scheduled coupon or principal payments may be reduced in the event of a catastrophe. If the yield is high enough, an investor may be attracted to the bond, despite its default risk.

Contingent Payoff

A financial payoff whose value at least partly depends on the future value for an underlying risk vehicle. For example, a call option is a financial payoff whose value depends on the resulting price of an underlying stock at the end of the life of the option. One purpose of the present invention is to find a price for a contingent payoff superposed upon the underlying variable X, as shown in FIG. 3, step 301, for a traded risk vehicle, and as shown in FIG. 5, step 501, for an underwritten risk vehicle.

Cumulative Probabilities

A more technical name for the individual probability weights that, after a lowest-to-highest sort of cashflow outcomes, are cumulated, one by one, in ascending order, so that the first cumulation is the individual probability weight for the lowest cashflow outcome, and the second cumulation is the combination of the individual probability weights for the two lowest cashflow outcomes, and so on, until the last cumulation is the combination of the individual probability weights for all of the cashflow outcomes.

Concerning the uses, applications, and properties of the present invention, consider that, for any specific data value y of a variable X, the cumulative distribution function $F(y)$ gives the probability that the outcome of variable X will be less than or equal to y. Consider an ascending sequence of all possible outcomes $\{x_1, x_2, \ldots, x_N\}$ with individual probability weights $\{f(x_1), f(x_2), \ldots, f(x_N)\}$, respectively. Now compute cumulative probabilities as follows: $F(x_n)=f(x_1)+f(x_2)+\ldots+f(x_n)$, for $n=1, 2, \ldots, N$. Cumulative probabilities are produced in FIG. 2, step 205; FIG. 3, step 305; FIG. 4, step 405; FIG. 5, step 505.

Decumulation of Probability Weights

In the computer-implemented system and method, and computer-readable medium for use with computer means, of the invention, the new, transformed probability weights emerging from the Wang Transform kernel all need to be decumulated back into individual probability weights, as shown in FIG. 2, step 208; FIG. 3, step 308; FIG. 4, step 408; and FIG. 5, step 508.

Derivative

A financial instrument whose value is partly or wholly derived from the behavior, or value of, a referenced underlying financial instrument.

Discounting

In the computer-implemented system and method, and computer-readable medium for use with computer means, of the invention, the undiscounted Wang Price needs to be discounted by the risk-free interest rate to the final Wang Price, as shown in FIG. 2, step 211; FIG. 3, steps 311 or 318, FIG. 4, step 412; and FIG. 5, steps 511 and 518.

Distribution

A general term for a probability distribution of future potential cashflow outcomes for an underlying risk vehicle.

Distorted Probability Weights

A general term for probability weights that have been decumulated after undergoing the core process, or kernel, of the Wang Transform. The probability weights have been transformed, or distorted, by the Wang Transform. When the prospective future cashflow values of a risk vehicle are multiplied to these distorted weights, and their products summed, the resulting Wang Price reflects the adjustment for risk.

Empirical Distribution

A probability distribution that has been shaped by the data of past historical experience.

Exceedence Probability

The overall probability that the future value of an underlying risk vehicle will exceed a certain amount of money, in terms of either gains as an asset, or losses as a liability. Exceedence probabilities are used frequently in underwriting financial obligations in insurance, credit, health care, and pensions, and especially in catastrophe insurance pricing.

In more technical discussions of the uses, applications, and properties of the present invention, consider that, for any data value y of a variable X, the exceedence probability G(y) gives the probability that the outcome of variable X will exceed y. Note that $G(y)=1-F(y)$.

Fair Value

A price for an asset or liability that has been adjusted for risk, and discounted by the risk-free interest rate.

Historical Distribution

A probability distribution that has been shaped by the data of past historical experience.

Implied Lambda

The inferred "market price of risk" for a known probability distribution and current market price for an underlying risk vehicle, as calculated by the computer-implemented method, and computer-readable medium for use with a computer means, of the invention. For the very limited case where an underlying risk vehicle has historically-known traded market prices that are lognormally distributed, the market price of risk over a specific period of time equals the difference between the expected rate of return for the underlying risk vehicle, otherwise called mu, and the risk-free interest rate, otherwise called r, whose remainder is then divided by the volatility of the return, where the volatility is calculated as the standard deviation of the return, otherwise called sigma.

Lambda can be implied from a known probability distribution and known current market price for an underlying risk vehicle by following all of the steps of FIG. 4.

Implied Volatility

Under the Nobel Prize winning Black-Scholes formula, there is a one-to-one correspondence between the price for a specified option and the volatility of the underlying asset price. When prices for a specified option and current underlying asset are both known, the current volatility for that underlying can be inferred. This inferred volatility is called implied volatility. Calculating an accurate implied volatility, however, relies heavily on the Black-Scholes assumption that price changes in the underlying asset are strictly lognormal in distribution.

Individual Probability Weights

A more technical name for the initial probabilities that are attached to cash value outcomes. For example, the price for PQR stock may have a 5% chance of gaining 20 dollars during the next three months, a 80% chance of neither gaining or losing in value, and a 15% chance of losing 20 dollars in value. These probabilities are considered to be weights, because, after the application of the Wang Transform kernel, their newly transformed probabilities are multiplied to their respective cashflow values.

In more technical discussions of the uses, applications, and properties of the present invention, consider that, the probability f(x) is assigned to a specific cash value outcome x. These individual probability weights can be found in FIGS. 2, 3, 4, and 5, in steps 203, 303, 403, 503.

Iteration

Testing different lambda values so that the resulting Wang Price after discounting by the risk free interest rate will match the observed market price for the underlying asset or liability in question.

Kernel

A core process in a computer-implemented method, or computer-readable medium for use with computer means, of an invention. For this invention, the kernel, or core process, is the data-processing steps of the Wang Transform, as shown in FIG. 1. For the two-factor model, the kernel, or core process, is the data processing steps of the Wang Transform, as shown in FIG. 6.

Lambda

The market price of risk for an underlying risk vehicle, or for its contingent payoff, which can be either selected for use in the computer-implemented system and method, and computer-readable medium for use with computer means, of the invention, or implied from the computer-implemented method and computer-readable medium of the invention.

When selected for use in the computer-implemented system and method, and computer-readable medium for use with computer means, of the invention, lambda is combined with the cumulative probability distribution, to create a "shift," that is, a marked increase or decrease, in their values. The "lambda shift" is shown in FIG. 1, step 104.

Market Price of Risk

A specific parameter value used in the computer-implemented system and method, and computer-readable medium for use with computer means, of the invention, represented by "lambda," a Greek letter.

For the very limited case of underlying risk vehicles whose historically-known traded market prices are lognormally distributed, the market price of risk over a specific period of time equals the difference between the expected rate of return for the underlying risk vehicle, and the risk-free interest rate, whose remainder is then divided by the volatility of the return, where the volatility is calculated as the standard deviation of the return.

In the real-world cases where an underlying risk vehicle exhibits any probability distribution, and any current market price, computer-implemented system and method, and computer-readable medium for use with computer means, of the invention, can be used to infer the market price of risk as a specific parameter value, in a way that replicates the result, but not the approach, of implementations of modern options theory for lognormal distributions.

Thus the computer-implemented system and method, and computer-readable medium for use with computer means, of the invention, extends the applicability of the market price of risk to any underwritten or traded underlying risk vehicle with any kind of historically-known or computer-generated probability distributions.

In the computer-implemented system and method, and computer-readable medium for use with computer means, of the invention, an initial lambda value can be selected to test whether a known probability distribution produces the known current underlying price. If not, this initial lambda value can be tweaked, by adjustment higher or lower, as shown in FIG. 3, step 314, and in FIG. 5, step 514.

Net Present Value

The discounted value of an underlying risk vehicle, from its future value to the present, using the risk-free interest rate.

New Probability Weights

Old probability weights, in cumulative distributed form, are given to the computer-implemented system and method, and computer-readable medium for use with computer means, of the invention, to produce new probability weights, in cumulative distributed form, as shown in FIG. 2, step 207, FIG. 3, step 307; FIG. 4, step 407, and FIG. 5, step 507.

Normal Inversion

The inverse mapping from each cumulative probability to a corresponding outcome of a normally distributed variable, with a mean equal to zero, and a variance equal to one.

In the computer-implemented system and method, and computer-readable medium for use with computer means, of the invention, the standard normal inversion is employed to inversely map a set of cumulated probabilities, before a selected lambda is added, and a standard normal cumulative distribution is performed, as shown on FIG. 1, step 103.

Parameter Uncertainty

At the tails of a projected probability distribution, a lambda shift may not sufficiently incorporate the full adjustment needed to compensate for increased uncertainty. Outlying and extreme events, by their nature, are not easily comparable to or hedgeable against mainstream projected outcomes.

For example, for way-out-of-the-money contingent claims, catastrophic insurance losses, or way-beyond-a-horizon-date reinsurance claim settlements, markets may be illiquid, benchmark data sparse, negotiations difficult, and the cost of keeping capital reserves high. These factors contribute to a special level of uncertainty associated with these extreme projected outcomes and their respective probabilities.

Parameter uncertainty can be accounted for by using a two-factor model, as shown in FIG. 6.

Payoff Function

In the computer-implemented system and method, and computer-readable medium for use with computer means, of the invention, a payoff function is any customized table of outcomes that has been arranged between two counterparties, consisting of one or more potential future events, and their respective cashflow value outcomes. To price the risk of this payoff function, the counterparties will typically assess the probabilities that each potential future event, and thus their respective cashflow value outcomes, will occur. A payoff function can be based on an option, a stop-loss provision, or any other type of contingent event arrangement for transferring cashflows.

A payoff function is handled the same way as an underlying risk vehicle, in the computer-implemented system and method, and computer-readable medium for use with computer means, of the invention, that is, a series of cashflow values are multiplied to their respective probability weights after they have been transformed, except that these cashflow values have been generated by applying the payoff function to each variable outcome of the underlying risk vehicle, as shown in FIG. 3, step 315, FIG. 4, step 409, and FIG. 5, step 515.

P-Measure

The "objective" probability weights and attached cash values for the future price of an underlying risk vehicle, as provided by a historically-known or computer-generated distribution. For example, the historical volatility of an underlying stock is traditionally defined as a P-measure. Underwriters typically use P-measure to describe risk. In the prior art, P-measures and Q-measures were hard to compare, like apples and oranges, and almost impossible to translate. The computer-implemented system and method, and computer-readable medium for use with computer means, of the invention, transforms any type of P-measure for an underlying risk vehicle into an equivalent Q-measure, with some adjustments to the market price of risk, allowing for some translation between the two measures.

Probability Distribution

In the computer-implemented system and method, and computer-readable medium for use with computer means, of the invention, any table of potential future outcomes, comprised of two columns of numeric information, the first column holding probabilities, or chances, of a cash value occurring, and the second column holding the cash values themselves. This "discretized" probability distribution, that is, a "row-by-row" set of outcome probabilities and cash values, can be selected from historically-known, or computer-generated prices. Such a probability distribution is selected in FIG. 2, step 203; FIG. 3, step 303; FIG. 4, step 403; and FIG. 5, step 503.

Q-Measure

The "subjective" probability weights and attached cash values for the future price of an underlying risk vehicle, as inferred or implied by means of isolating variables, decomposed from equations, that analyze the current market price. For example, the implied volatility of an underlying stock, as inferred from modern options theory, is traditionally defined as a Q-measure. Traders typically use Q-measure to describe risk. In the prior art, P-measures and Q-measures were hard to compare, like apples and oranges, and almost impossible to translate. The computer-implemented system and method, and computer-readable medium for use with computer means, of the invention, transforms any type of P-measure for an underlying risk vehicle into an equivalent Q-measure, with some adjustments to the market price of risk, allowing for some translation.

Risk

Any exposure to uncertainty of cashflow outcome. Uncertain cashflow outcomes for actual and potential commitments, as related to events, rights and obligations, each uniquely projecting an uncertain rate of return. The collection of all potential deviations of value from the statistical mean of an expectation.

Risk-Free Interest Rate

Yield in the U.S. Treasury bill or the U.S. Government bond for the same time horizon in question.

Risk Management Environment

A collection of people, processes, and tools that identify, monitor, acquire, and dispose of risks, by means of underwriting, capitalizing, reserving, and transferring those risks.

Risk-Neutral

After adjusting an asset or liability for risk by inflating the probabilities for the worst cashflow outcomes and deflating the probabilities for the best outcomes, an individual evaluates an asset or liability using the expected mean value under the new probability weights. The new probability weights are called risk-neutral probabilities.

Sort

In a sort, each pairing of outcome probability and cash value is arranged, when all cash values having the same sign, in lowest-to-highest absolute value order, that is, in ascending order. When the cash values have different signs, that is, prospectively negative and positive values, the cashflows are sorted from worst-to-best, from the perspective of a holder of the risk vehicle. Each outcome probability "tags along" with its paired cash value during the sort. The sort is found in FIG. 2, step 204; FIG. 3, step 304; FIG. 4, step 404; and FIG. 5, step 504.

Standard Normal Distribution

A welcome mathematical probability distribution with mean 0 and variance 1.

Student-T Distribution

A mathematical probability distribution with a parameter k being the degrees of freedom, where k can be any positive integer such as 3, 4, 5, etc. The degrees of freedom k can also be generalized to positive non-integer numbers. The Student-t distribution can also be re-scaled to adjust to a specified density at x=0.

Transformed Probability Weights

The new probability weights obtained by applying the computer-implemented system and method, and computer-readable medium for use with computer means, of the invention, to a set of cumulative probabilities. Also sometimes called Transformed Cumulative Probability Weights, or Transformed Probabilities. Transformed probability weights are produced in FIG. 1, step 106, and FIG. 6, step 106.

Tweaking Lambda

In the computer-implemented system and method, and computer-readable medium for use with computer means, of the invention, any adjustment to the lambda value, as applied to a given probability distribution, to produce a tolerably close Wang Price to the currently known market price, for an underlying risk vehicle, as shown in FIG. 3, step 314, or FIG. 5, step 514. Tweaking lambda also can help produce a Wang Price that is tolerably close to the currently known market price for a contingent payoff, as shown in FIG. 4, step 415. Tweaking lambda is the same as iterating lambda.

Two-Factor Model

In the two-factor version of the computer-implemented system and method, and computer-readable medium for use with computer means, of the invention, one can adjust for risk, as well as adjust for parameter uncertainty, in the same process. While the first factor "lambda" remains to be the market price of risk, the second factor "k" is calibrated by a Student-t distribution with k degrees of freedom. This two-factor model, as shown in FIG. 6, applies a Student-t distribution in Step 605, rather than a normal distribution. Mathematically, this novel and valuable result is expressed as the following: $F^*(x)=\Psi[\Phi^{-1}(F(x))+\lambda]$, where $\Psi$ has a Student-t distribution.

The two-factor model is based here on the Student-t distribution in Step 605 of FIG. 6, though more computationally intensive embodiments of the invention allow for other distributions such as mixed normal or empirically constructed distributions. This two-factor model is an important enhancement to the invention for pricing risks for very low frequency but very high severity exposures.

Underlying

A financial instrument whose behavior, or value, is referenced by a derivative financial instrument, for the purposes of determining the value of the derivative financial instrument.

Underlying Variable

A more technical name for the future value for an underlying risk vehicle. The underlying risk vehicle can be any asset, liability, or a mix of assets and liabilities, traded or underwritten.

In more technical discussions of the uses, applications, and properties of the present invention, consider that, the underlying variable X is the future value for a specified underlying risk vehicle. One purpose of the computer-implemented system and method, and computer-readable medium for use with computer means, of the invention, is to find the Wang Price for this underlying variable X, a useful data result, as shown in FIG. 2, step 201.

Underlying Risk Vehicle

A universal definition for any group of one or more underwritten or traded assets and liabilities, whose future risk-neutral price can be anticipated by applying the computer-implemented system and method, and computer-readable medium for use with computer means, of the invention, to a historically-known or computer-generated distribution of potential outcomes for that risk vehicle, comprised of a set of probabilities and attached cash values, along with a market price of risk for that risk vehicle.

The underlying risk vehicle can be a stock, bond, currency, commodity, or some other traded financial instrument, for example, IBM common stock. The underlying risk vehicle can also be any collection of insurance, credit, health care, pension, or some other underwritten contract obligations, for example, a catastrophe insurance claims index. The underlying risk vehicle can also be a customized contract of cash delivery between two economic entities whose outcome probabilities and cash payoffs are already known, for example, a specified cash delivery in the event that sustained wind speed during a specified period of time exceeds a threshold.

The underlying risk vehicle is selected for computer-implemented system and method, and computer-readable medium for use with computer means, of the invention, in FIG. 2, step 202; FIG. 3, step 302; and FIG. 5, step 502.

Volatility

The standard deviation of the return for a financial instrument, or underlying risk vehicle, over some period of time.

Wang Price

The expected future value, discounted for the risk-free interest rate, of the underlying risk vehicle, or, of any contingent payoff for that underlying. The Wang Price is determined by applying the computer-implemented system and method, and computer-readable medium for use with computer means, of the invention, to a set of cumulative probabilities, to gain a new set of transformed probability weights, and then by multiplying the cash values attached to those weights, to gain a set of weighted values. The total of these weighted values, when discounted by the risk-free interest rate, gives the Wang Price.

The Wang Price recovers the risk-neutral price that is calculated from lognormal probability distributions by Black-Scholes and other implementations of modern options theory. The Wang Price also produces a risk-neutral price for all other probability distributions, which in the prior art have not been effectively priced.

The Wang Price is produced in FIG. 2, step 212, for an underlying risk vehicle identified as a group of one or more traded assets and liabilities; FIG. 3, step 312, for an underlying risk vehicle identified as a group of one or more traded assets and liabilities; FIG. 3, step 319, for contingent payoffs for the outcome of an underlying risk vehicle identified as a group of one or more traded assets and liabilities; FIG. 5, 512, for the outcome of an underlying risk vehicle identified as a group of one or more underlying assets and liabilities; and FIG. 5, step 519, for contingent payoffs for the outcome of an underlying risk vehicle identified as a group of one or more underwritten assets and liabilities.

Wang Transform

A kernel, or core process, of the computer-implemented system and method, and computer-readable medium for use with computer means, that transforms any cumulative probability to yield a new, distorted, cumulative probability. In more technical discussions of the uses, applications, and properties of the present invention, consider that, the Wang Transform kernel of the invention transforms the cumulative probability F(y) to yield a new cumulative probability F*(y), as shown in FIG. 1, steps 102 through 106. A two-factor model of the Wang Transform kernel of the invention transforms the cumulative probability F(y) to yield a new cumulative probability F*(y), as shown in FIG. 6, steps 602 through 606.

Weather Derivative

A financial instrument that specifies a financial settlement between counterparties based on observed events of temperature, rainfall, snowfall, or wind speed.

Weighted Values

In the computer-implemented system and method, and computer-readable medium for use with computer means, of the invention, the product of multiplying the cashflow values of a distribution to their new probability weights, after decumulation, for an underlying risk vehicle for a selected group of traded or underwritten assets and liabilities, as shown in FIG. 2, step 209; FIG. 3, step 309; FIG. 4, step 410; and FIG. 5, step 509, or, alternatively, for a contingent payoff, as shown in FIG. 3, step 317, FIG. 4, step 411, and FIG. 5, step 517.

SUMMARY OF THE INVENTION

The invention is a computer-implemented system and method, and computer-readable medium for use with computer means, that enables portfolio managers to effectively price any traded or underwritten risk in finance and insurance with any historically-known or computer-generated probability distribution. The invention provides a universal approach to pricing assets and liabilities, whether traded on an exchange or over-the-counter market, or underwritten for direct risk-transfer, whether grouped or segregated, or even positive or negative in value.

It is an object and advantage of the invention to be applicable to the entire universe of probability distributions, not just normal or lognormal distributions. The prior art heavily relied on the normal or lognormal assumptions, and took ad hoc corrective measures in practice to reflect departures from these assumptions. For instance, when using Black-Scholes formula to price options written on a stock, different volatility values are used for different strike prices. This corrective measure is inconsistent with the Black-Scholes assumption that stock prices follow a lognormal distribution and thus the same volatility should be used for all strike prices. In the special case of lognormally distributed asset prices, this invention recovers the CAPM price for the expected rate of return and the Black-Scholes price for options.

It is an object and advantage of the invention to allow risk management professionals to use any probability distribution, as suggested by historical data or by forecasting models in their discretionary activities of pricing, underwriting, reserving, capitalizing, transferring, or trading various risk vehicles.

It is an object and advantage of the invention to price any blending of assets and liabilities, whose net cash value can potentially take both positive and negative values. Most financial price models deal with strictly assets, which cannot be negative in value. For instance, the minimum value of one share of common stock is zero, and cannot be negative. On the other hand, actuarial pricing methods deal solely with liabilities, or losses, which can only be negative in value.

With the emergence of integrated financial and insurance products, and with insurance risks being traded in the capital market, the prior art is deficient to price such products. By allowing an underlying risk vehicle to take on positive or negative values, this invention provides consistent pricing, where an asset can be treated as a negative liability, or alternatively, a liability can be treated as negative asset.

It is an object and advantage of the invention to be equally applicable for both traded assets and underwritten risks. Traded assets are often priced in relation to other traded assets, and a subjective probability measure (called Q-measure) can be implied from the market prices of assets. For instance, the default probability of a bond can be inferred from its market interest-rate spreads over the risk-free treasury bonds. Underwritten risks, on the other hand, are evaluated using their objective probabilities (P-measure) of loss. In the prior art, there was a deep gap between these two approaches. This need was reflected in the frustrations in the communications between a capital markets professional (who uses Q-measure in the course of trading) and an insurance professional (who uses P-measure in the course of underwriting). This invention provides a pricing bridge between the Q-measure world and P-measure world. With this invention, a P-measure can be easily converted to a Q-measure, and vice versa.

It is an object and advantage of the invention, after a series of data-processing steps, to produce a useful data result, called the Wang Price. The Wang Price is a fair valuation for the future price of a risk vehicle, where the mean of future expected outcomes, as weighted by their respective individual probabilities, has been adjusted for risk.

It is an object and advantage of this invention that when the invention is applied to a traded financial instrument whose outcomes are normally distributed, and the lambda value of the invention further iterated so that the discounted Wang Price converges to equal the last market quote for that financial instrument, the lambda value, as obtained by the process of this invention, is equal to the Sharpe Ratio.

It is an object and advantage of the present invention to generate a lambda value, representing the market price of risk, for underlying assets and liabilities when their current market prices and past price movements are known, or future market prices and price movements can be projected, by a normal, or non-normal distribution of outcomes.

It is an object and advantage of the present invention to measure the uncertainty of a variable representing a future cashflow outcome, within any historically-known or computer-generated distribution of outcomes.

It is an object and advantage of the present invention to assess the relative risk-adjusted values of traded portfolios, or the relative risk-adjusted values of underwriting selections of managed accounts.

BRIEF DESCRIPTION OF THE DRAWINGS

FIG. 7 is Table 1 describing unsorted Intel stock price distribution.

FIG. 8 is Table 2 describing sorted Intel stock price distribution.

FIG. 9 is Table 3 describing kernel, or core process, of the Wang Transform (Lambda=0.4525).

FIG. 10 is Table 4 describing Wang Price of the future Intel stock in one month (Lambda=0.4525).

FIG. 11 is Table 5 describing Wang Price of a European call option on Intel stock with a strike price of 140 (Lambda=0.4685).

FIG. 12 is Table 6 describing Wang Price for the underlying (Lambda=0.0854).

FIG. 13 is Table 7 describing Wang Price for the put option with a strike price of 0.00 (Lambda=0.10).

FIG. 14 is Table 8 describing rating migration for a BBB-rated bond over 1 year.

FIG. 15 is Table 9 describing Wang Price of the BBB-bond (Lambda=0.698).

FIG. 16 is Table 10 describing estimation of true market price of risk (Lambda=0.788).

FIG. 17 is Table 11 describing estimated probability distribution for earthquake payoff.

FIG. 18 is Table 12 describing Wang Price for the earthquake insurance (Lambda=0.3).

FIG. 19 is Table 13 describing Wang Price of the contingent payoff on the earthquake insurance.

FIG. 20 is Table 14 describing a variation of Table 12, using exceedence probabilities.

FIG. 21 is Table 15 describing an insurance policy covering the total loss of a satellite launch (Lambda=0.2, degrees of freedom=11).

DETAILED DESCRIPTION OF THE PREFERRED EMBODIMENTS

The foregoing and other objects, aspects, and advantages will be better understood from the following detailed description of a preferred embodiment of the invention with reference to the drawings. As defined herein, the "method" refers to the data processing-system, a computer-implemented method, and computer-readable medium of the invention that prices financial or insurance risks.

Figure 1:
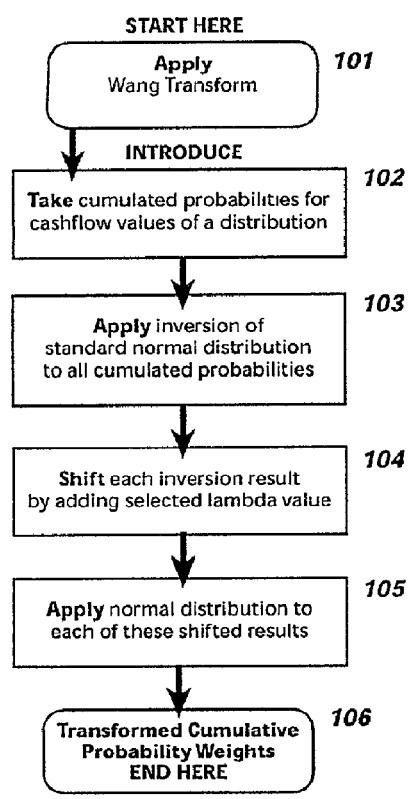
FIG. 1 is a flow chart of the preferred embodiment of the present invention where the invention may be applied to a cumulative probability distribution of cashflows.

The core process, or kernel, of the invention, is the Wang Transform. Every process of the invention requires the operation of the kernel, to transform every cumulative probability paired to a set of cashflow outcomes, to yield a new, distorted, cumulative probability. Specifically, the cumulative probability $F(y)$ is transformed to yield a new useful data result, the cumulative probability $F^*(y)$, as shown in FIG. 1, steps 102 through 106.

Assets and liabilities, whether traded or underwritten, are risk vehicles, which means that they are the legal contrivances for undertaking some type of capitalized risk—for example, a financial or insurance risk. One begins using the invention, by identifying an underlying risk vehicle as a container of sorts, itself holding a group of one or more individual assets or liabilities, each of which can be either traded or underwritten. The invention is capable of outputting the fair value of this underlying risk vehicle, which is defined as its price in a transaction, after an adjustment for risk that is manifested in the tabled distribution of outcomes for that underlying risk vehicle.

Figure 2:
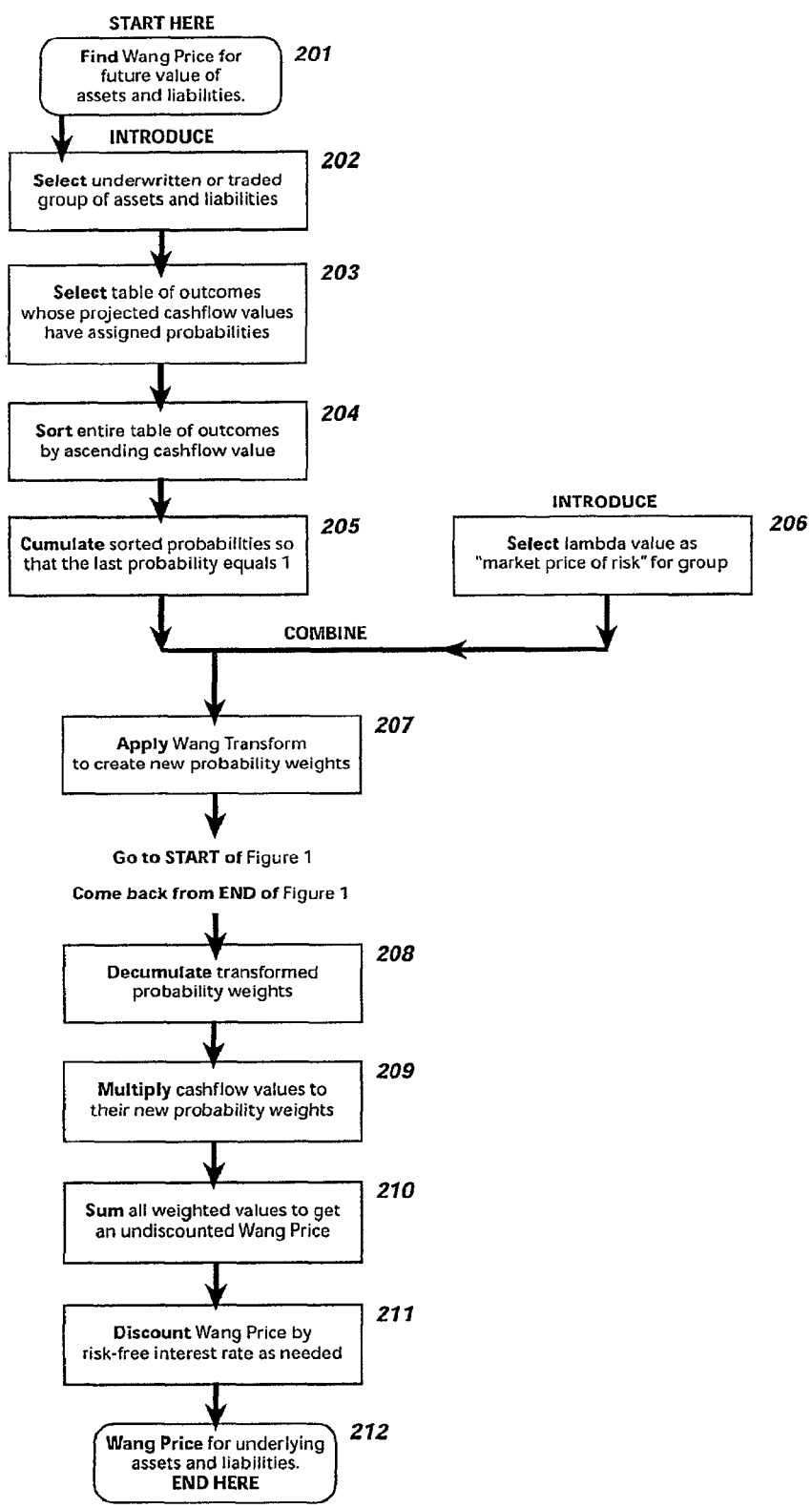
FIG. 2 is a flow chart showing how to price the future value of assets and liabilities after selecting a known lambda value for their market price of risk.

If the underlying risk vehicle is one whose "market price of risk" is known, or already inferred, then one would use FIG. 2 as the process for obtaining the fair value of that underlying risk vehicle, when that fair price is not yet known, or, if the latest market price for the underlying is not known. This fair value of the underlying risk vehicle is called the Wang Price. For one skilled in the art, the "market price of risk" is the Sharpe Ratio for normally distributed outcomes, or, interchangeably, for outcomes with lognormal returns. This "market price of risk" is also identified in the prior art literature as the lambda value.

Figure 3:
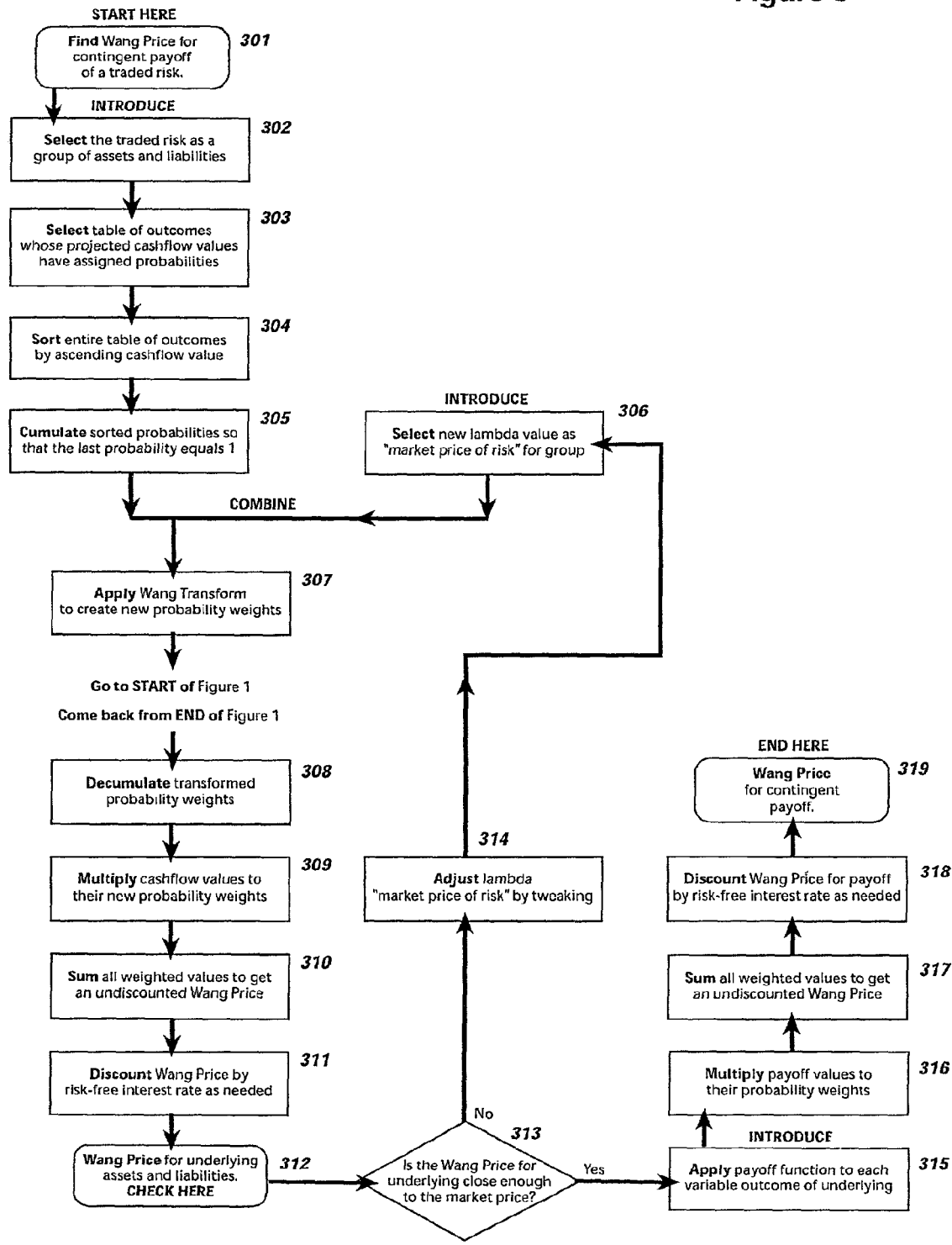
FIG. 3 is a flow chart showing how to price a contingent payoff on an underlying traded asset/risk.

If the risk vehicle is a contingent payoff, like an option, referencing a traded underlying risk vehicle, then one would use FIG. 3 as the process for obtaining the fair value of the contingent payoff in question. The fair value of the traded underlying risk vehicle is obtained by iterating lambda, whose starter value can be the trading equivalent of the "market price of risk," called the Sharpe Ratio, until the sum of weighted outcomes reflecting the variability of such fair value this Wang Price converges to equal the last known market price for the instrument. After this convergence has been accomplished, the function for the contingent payoff is applied to each of the variable outcomes of the underlying, to obtain the fair value of the contingent payoff. The fair value of the underlying risk vehicle obtained by this process is identified as the Wang Price for the underlying risk vehicle. The fair value of the contingent payoff obtained by this process is identified as the Wang Price for the contingent payoff.

Figure 4:
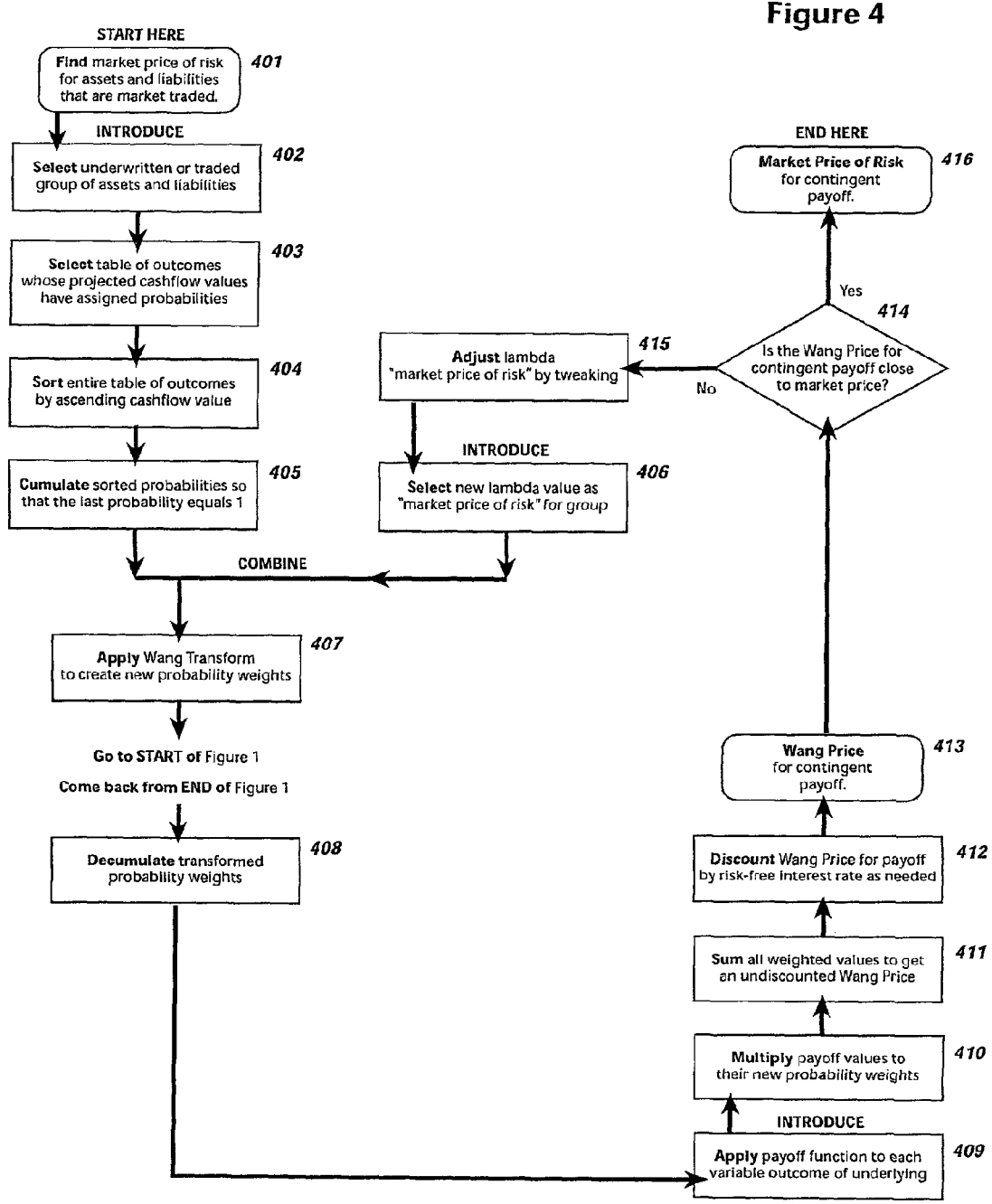
FIG. 4 is a flow chart showing how to estimate lambda, or the market price of risk, for a group of assets and liabilities based on their known market prices.

If the last known market price for a traded underlying risk vehicle is known, one would use FIG. 4 as the process for obtaining the true "market price of risk," or lambda, for that risk vehicle. If the traded underlying risk vehicle has normally distributed outcomes, or, interchangeably, outcomes with lognormal returns, this process will produce a "market price of risk" that is equal to the Sharpe Ratio. If the traded risk vehicle, however, has non-normally distributed outcomes, or non-lognormal returns, this process will produce a "market price of risk" that is more accurate than the Sharpe Ratio.

Figure 5:
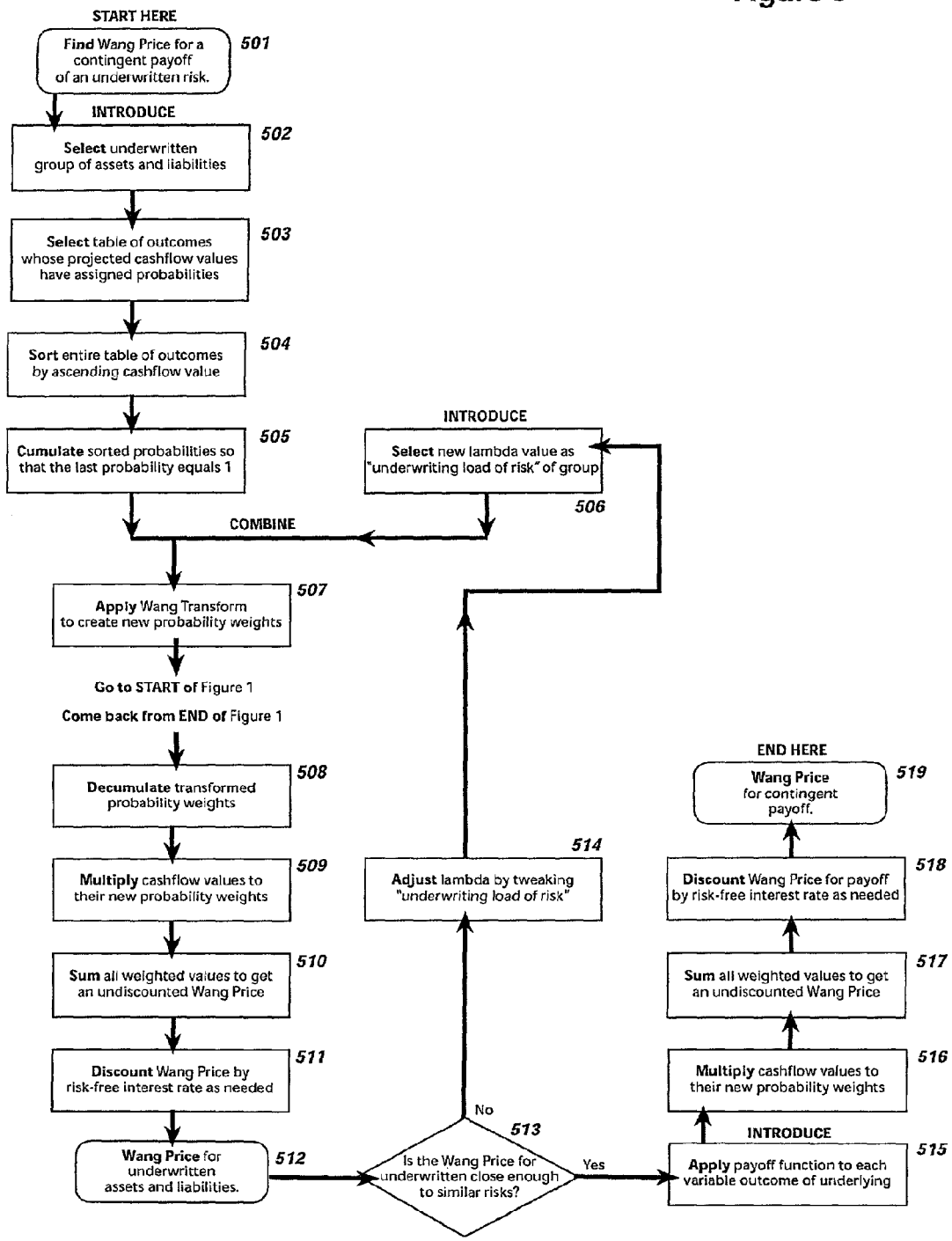
FIG. 5 is a flow chart showing how to price a contingent payoff of an underwritten risk.

If the risk vehicle is a contingent payoff, like a loss layer of reinsurance, referencing an underwritten underlying risk vehicle, then one would use FIG. 5 as the process for obtaining the fair value of the contingent payoff in question. The fair value of the underwritten underlying risk vehicle is obtained by iterating lambda, whose starter value can be the underwriting equivalent of the "market price of risk" called the "underwriting load of risk," until the sum of weighted outcomes reflecting the variability of such fair value converges to equal similar capital loadings for similarly underwritten risks. After this convergence has been accomplished, the function for the contingent payoff is applied to each of the variable outcomes of the underlying, to obtain the fair value of the contingent payoff. The fair value of the underlying risk vehicle obtained by this process is identified as the Wang Price for the underlying risk vehicle. The fair value of the contingent payoff obtained by this process is identified as the Wang Price for the contingent payoff.

Figure 6:
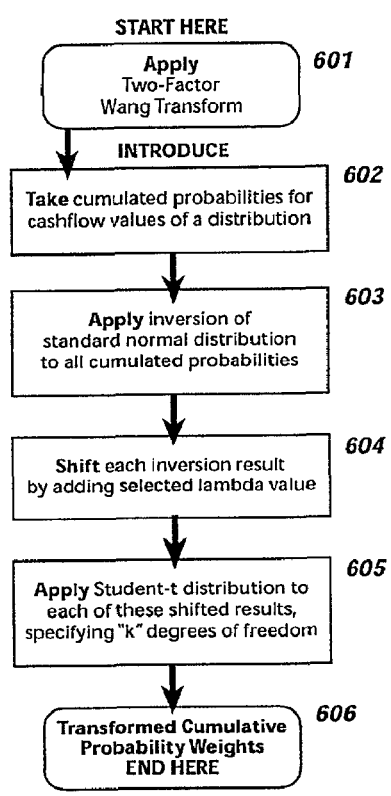
FIG. 6 is a flow chart of the preferred embodiment of the present invention where a two-factor model may be applied to a cumulative probability distribution of cashflows.

For greater precision in evaluating fair value of an underlying risk vehicle that is a group of one or more traded and underwritten assets and liabilities whose data collections of sampled outcomes and sampled probabilities may be incomplete, or for greater consideration in evaluating risk vehicles whose outcomes are rare, extreme, or outlying, then one would use FIG. 6 as the core process, or kernel, for transforming the weighted probabilities of the risk vehicle in question. The core process in FIG. 6 is a two-factor model for evaluating fair value. The first factor is the "market price of risk" or its underwriting equivalent, and the second factor is called "parameter uncertainty," to incorporate the possible inadequacy for sampled outcomes and sampled probabilities used. The two-factor model of the core process transforms the cumulative probability $F(y)$ to yield a new cumulative probability $F^*(y)$, as shown in FIG. 6, steps 602 through 606.

Example 1

Finding the Fair Value for a Traded Risk Vehicle

For the first example of this method, refer to Table 1, which is an unsorted Intel stock price distribution for closing prices for 24 monthly periods, from June 1998 until June 2000. Intel is identified as an underlying risk vehicle, consisting of a group of only one traded asset, so the method of the invention turns to FIG. 2 to find the fair value for that underlying risk vehicle at some point in the future. This fair value is called pricing, with adjustment for risk. Under the process of this invention, this pricing is obtained by generating a useful data result, an output, called the Wang Price.

In FIG. 2, the method starts by determining the objective of the process. The objective of the process is to find the Wang Price for the future value of the risk vehicle in question, 201. The future value of Intel at 1 month from the time of the last market quote is the objective. This satisfies steps 201, where the particular future date has been described, by a horizon date of 1 month, and 202, where the selection of the group of one or many underwritten and traded assets and liabilities have been described, by Intel stock. Thus the underlying risk vehicle consists solely of Intel stock.

The method next selects a table of future prospective outcomes, whose projected cashflow values have assigned probabilities. The selected table of prospective future cashflow outcomes and respective probabilities is found in Table 1.

Table 1 is an unsorted Intel stock price distribution. This table is generated, by one skilled in the art, by, first, listing the monthly calendar periods of the monthly closes, in Column 1A. For example, the most recent monthly calendar period on this table is June 2000. Each monthly closing stock price, has been divided by the previous monthly closing stock price, to get a monthly return, in Column 1B. For example, the most recent monthly return on this table is 0.03084, for June 2000.

The current price, is the monthly closing stock price at the end of June 2000, which is $133.688, in Column 1C. This current price serves as the base price for future projected outcomes. By multiplying the current price to each monthly return, that is, by multiplying 1B to 1C, across 24 rows, the table provides a table of prospective future cashflow outcomes, in Column 1D. For example, the June 2000 monthly return of 0.03084, is multiplied by the most recent stock price of 133.688, to get 4.123. This result is then added to the most recent stock price of 133.688, to get 137.811.

There are 24 future outcomes generated in this manner, each outcome having a $1/24$ probability of taking place. For example, the future outcome generated by the June monthly return, as multiplied to the current price, has a probability of 0.04167, which is $1/24$.

With this pairing of prospective future cashflow outcomes, in Column 1D, with their respective probabilities, in Column 1E, the table satisfies step 203.

The next step in the method, 204, sorts the table of prospective future outcomes, by ascending cashflow value. The entire table of outcomes is comprised of two columns, a column holding prospective future cashflow values, and a column holding their respective probabilities. These future cashflow values, and their respective probabilities, are sorted together, by ascending cashflow values, from lowest value to highest value, starting from the lowest cashflow value, and ending with the highest cashflow value, as shown in Table 2.

Table 2 is the sorted Intel stock price distribution. Column 2A shows the monthly closes that generated the prospective future cashflow values, after sorting. For example, the topmost monthly calendar return on this table is May 1999. This is because the May 1999 monthly return, after being multiplied to the current price, created a product that was then added to the current price, generating the lowest prospective future cashflow value, $109.44 in Table 1, Column 1D. When Table 1 was sorted to produce Table 2, this value was sorted to the top of Column 2B.

Column 2C shows the respective probabilities associated with each prospective future cashflow result. For example, the prospective future cashflow result of $109.44 has a probability of $1/24$, or 0.04167. The sorted columns of 2B and 2C satisfy step 204 in the process.

The next step is to cumulate the sorted probabilities, so that the last probability equals the number 1. Cumulating means adding all of the values preceding, to the values at hand, thereby producing a cumulative result. For example, the cumulative probability of the $109.44 future result, is equal to the values of the preceding probabilities above it, plus the value of the probability at hand. The preceding probabilities for $109.44 are 0, because there are no preceding probabilities in rows above $109.44 in the list. This value of 0 is added to the probability at hand, which is 0.04167, as shown at the top of Column 2D.

For the next prospective future value, $112.59, the cumulative probability is adding all of the probabilities preceding the respective probability, in rows above, which is 0.04167, and adding the probability at hand, in the row across, which is 0.04167, to make 0.08333.

For the next prospective future value, $119.80, the cumulative probability is adding all of the probabilities preceding the respective probability, in rows above, which is 0.08333, and adding the probability at hand, in the row across, which is 0.04167, to make 0.12500.

The entire column of 2D is cumulated in this fashion, until the last prospective future value, $172.38, has its probability cumulated, by adding all of the preceding probabilities, to the probability at hand. All of the preceding probabilities, 0.95833, is added to the probability at hand, 0.04167, to get the number 1. This satisfies step 205.

With the cumulated probabilities calculated for each prospective future cashflow result, the method introduces a value for the "market price of risk," also called lambda, step 206.

For the purposes of this example, the "market price of risk" is the Sharpe Ratio, which is the average return for each of the 24 months, minus the average risk-free rate for each of the 24 months, all divided by the average standard deviation of the returns for each of the 24 months. One skilled in the art is able to compute these values from the monthly closing returns in Table 1, to get 0.06281 for the average return for each of the 24 months, and obtain an average risk-free rate of 0.005833 for each of the 24 months. The average standard deviation of the returns for each of the 24 months is 0.12591. The Sharpe Ratio, is calculated as (0.06281-0.005833)/0.12591 to equal a "market price of risk" of 0.4525, under the assumption of lognormal returns for the 24 months in the table. This step satisfies step 206.

The method on FIG. 2 moves with step 207 to apply the core process, or kernel, of the Wang Transform, as found on FIG. 1, to create new probability weights, step 101. The core process starts by talking the cumulated probabilities of a distribution, as found in Table 2, Column 2D. This satisfies step 102.

The method on FIG. 1 then applies an inversion of the standard normal distribution to all of the cumulated probabilities of the distribution, 103. The inversion of a standard normal distribution can be defined and generated in many computer programming languages, but for the purposes of simplicity in this preferred embodiment, the method applies the Excel function of NORMINV to each of the cumulated probabilities, followed by the parameters 0,1.

The NORMINV function in Excel returns the inversion of the standard normal cumulative distribution, for the specified probability weight, mean, and standard deviation, when populated by the following three parameter values. X is the probability value corresponding to the normal distribution, between the numbers 0 and 1 inclusive. The number 0 is the arithmetic mean of the distribution. The number 1 is the standard deviation of the distribution. (NORMSINV is a summary function for the NORMINV function having a 0 mean and a 1 standard deviation, and can be used for the purposes described herein as well.)

For example, in Table 3, NORMINV of the first cumulated probability of 0.04167 is -1.7317, as expressed in NORMINV(0.04167,0,1). NORMINV of the second cumulated probability of 0.08333 is -1.3830, and NORMINV of the third cumulated probability of 0.12500 is -1.1503. The NORMINV of the last cumulated probability of 1 is a generated positive infinity value, for which one skilled in the art substitutes an arbitrarily large finite number, of 500000. This column of individual inversely mapped results, in Column 3A, satisfies step 103.

The method on FIG. 1 then follows step 104, by taking the inversely mapped results of step 103, and shifting them, by the selected lambda value of step 206. Lambda represents the "market price of risk" and was earlier calculated by the method, at step 206, by means of a Sharpe Ratio, to obtain 0.4525. This value of 0.4525 is added to the inversely mapped results in Column 3A, to get shifted results, in Column 3B. For example, the inversely mapped result of -1.7317 is shifted by the lambda value of 0.4525, to get the shifted result of -1.2791. The inversely mapped result of -1.3830 is shifted by the lambda value of 0.4525 to get -0.9305. The inversely mapped result of -1.1503 is shifted by the lambda value of 0.4525 to get -0.6978. This satisfies step 104.

The method on FIG. 1 then follows step 105, by applying the normal distribution to each of these shifted results. For one skilled in the art, the standard normal distribution function is easily defined and generated in many generic computer programming languages, but for the purposes of simplicity in this preferred embodiment, the method applies the Excel function of NORMDIST to each of the shifted results, followed by the parameters 0,1,1.

The NORMDIST function in Excel returns the standard normal cumulative distribution, for the specified probability weight, mean, and standard deviation, when populated by the following four parameters. X is the value for which one wants the distribution. The number 0 is the arithmetic mean of the distribution. The number 1 is the standard deviation of the distribution. The number 1 is the logical value for a cumulative value. (NORMSDIST is a summary function for the NORMDIST function having a 0 mean and a 1 standard deviation, and can be used for the purposes described herein as well.)

For example, in Table 3, NORMDIST of the first shifted result of -1.2791 is 0.10043, as contained in the expression, NORMDIST(-1.2791),0,1,1). NORMDIST of the second shifted result of -0.9305 is 0.17607. NORMDIST of the third shifted result of -0.6978 is 0.24265. NORMDIST of the last cumulated probability of 500000.4525 is a regenerated value of 1.

This column of transformed cumulative probability weights, in Column 3C, satisfies step 105. The cumulative probability weights have been transformed by the core process of the Wang Transform, step 106, completing the core process, or kernel, of FIG. 1.

The method moves away from the completed core process, or kernel, of the Wang Transform in FIG. 1, and back to FIG. 2, to decumulate the transformed probability weights, step 208. Decumulating means subtracting the single value preceding, from the value at hand, thereby producing a decumulated result.

In Table 4, the transformed probability weights of Column 3C, are decumulated by subtracting the single weight one row above a particular weight, from that particular weight, to get a decumulated weight. For example, the transformed probability weight of 0.10043 has 0 subtracted from itself, because there is no probability weight one row above itself.

The transformed probability weight of 0.17607 has 0.10043 subtracted from itself, to make 0.07564, because 0.10043 is the probability weight one row above itself.

The transformed probability weight of 0.24264 has 0.17606 subtracted from itself, to make 0.06658, because 0.17606 is the probability weight one row above itself.

Step 208 consists of the continuing process of decumulating the transformed cumulative probability weights, so that the first decumulated weight equals the first cumulative weight, the second decumulated weight equals the second cumulative weight minus the first cumulative weight, the third decumulated weight equals the third cumulative weight minus the second cumulative weight, and so on, continuing until the last decumulated weight equals the last cumulative weight minus the next-to-last cumulative weight.

At the bottom of Column 3C, the transformed probability weight of 1.00000 has 0.98552 subtracted from itself, to make 0.01448, because 0.98552 is the probability weight one row above itself. This satisfies step 208.

In Table 4, the results of decumulation are in Column 4A, as decumulated probability weights. These results reflect the distorted probability weights produced by the core process, or kernel, of the Wang Transform. One may compare these distorted probability weights, of Column 4A, with the original probability weights, of Column 1E, as found in Table 1. The highest probability of Column 4A, 0.10042, is much higher than the highest probability of Column 1E, 0.04167. The lowest probability of Column 4A, 0.01448, is much lower than the lowest probability of Column 1E, 0.04167.

These distorted probability weights are highest for the worst prospective cashflow outcomes, and lowest for the best prospective cashflow outcomes. In Table 4, one may note the distorted probability weight for the worst prospective cashflow of 109.44, at 0.10042, which is the highest distorted probability weight. One may also note the distorted probability weight for the best prospective cashflow of 172.38, at 0.01448, which is the lowest distorted probability weight.

These decumulated probability weights, interchangeably called distorted probability weights, add up to the number 1. This means that they reflect the probabilities of a new distribution. This new probability distribution is called a distorted probability weighted distribution.

The method then moves to step 209, by multiplying all of the prospective future cashflow values to their distorted probability weights. In Table 4, for example, the future prospective stock price of 109.442 in Column 3B is multiplied by the distorted probability weight of 0.10042 in 4A, to get a weighted value of 10.990. The future prospective stock price of 112.442 is multiplied by the distorted probability weight of 0.07564, to get a weighted value of 8.516. The future prospective stock price of 119.798 is multiplied by the distorted probability weight of 0.06658, to get a weighted value of 7.976. This satisfies step 209.

The method then moves to step 210, which sums all of the weighted values to get an undiscounted Wang Price. In Table 4, all 24 of the weighted values in Column 4B are added together, to equal $134.728. This is the undiscounted Wang Price for Intel stock in 1 month. This satisfies step 210.

The method finally discounts the Wang Price by the risk-free interest rate in step 211. The undiscounted Wang Price in 1 month is $134.728. By multiplying the risk-free interest rate of 1 month to this Wang Price, and subtracting this amount from the Wang Price, the method obtains the discounted Wang Price. The risk-free interest rate of 1 month is 0.005833, as obtained from the calculation of the Sharpe Ratio in step 206. Multiplying the Wang Price of $134.728 by 0.005833, the method gets $0.785, which is further subtracted from $134.728 to obtain a discounted Wang Price of $133.944, as shown on the bottom of Column 4B. This satisfies step 211, and obtains the discounted Wang Price as processed through FIG. 2, step 212. This completes FIG. 2. This completes Example 1.

The method of the process for FIG. 2 can be used to obtain a price, after adjustment for risk, for an underlying risk vehicle that consists of a group of any number of other traded assets and liabilities, such as stocks or other equity securities, bills, bonds, notes, or other debt securities, currencies of various countries, commodities of physical, agricultural, or financial delivery, asset-backed or liability linked securities or contractual obligations, and weather derivatives and other observable physical phenomena whose outcomes can be linked to financial outcomes. As generated by the method, this price is called the Wang Price.

The Wang Price, after discounting, is a useful data result, because it represents the present fair value of an underlying risk vehicle that itself can be an asset or a liability, or a group of any greater number of assets or liabilities. This present fair value can be compared to the present fair value of other underlying risk vehicles, or of other financial instruments, on an even playing field, so that risk management professionals can identify, monitor, acquire, and dispose of assets and liabilities according to relative comparisons of expected portfolio risks and returns.

Example 2

Finding the Fair Value for an Option on a Traded Underlying Risk Vehicle

For the second example of this method, refer to Table 5, which is a European call option at a strike price of $140 on an Intel stock price distribution for closing prices for 24 monthly periods, from June 1998 until June 2000, whose probabilities have already been transformed by the previous example. Intel has been identified already as a traded underlying risk vehicle, so the method of the invention turns to FIG. 3 to find the fair value for the contingent payoff on that underlying risk vehicle at some point in the future. Under the process of this invention, this pricing is obtained by generating a useful data result for the underlying stock, in the form of an output called the Wang Price, and then applying a payoff function of MAX (140−X,0) to the distorted probabilities of the underlying stock, representing X.

In FIG. 3, the method starts by determining the objective of the process. The objective of the process is to find the Wang Price for the future value of the contingent payoff on the underlying risk vehicle, 301.

The future value of the European call option whose strike price is $140 at 1 month from the time of the last market quote is the objective. This satisfies steps 301, where the particular future date has been described, by a horizon date of 1 month, and 302, where the selection of a traded underlying risk vehicle has been described as consisting of a single asset, namely Intel stock.

One skilled in the art would notice that the steps 303 through 312 exactly replicate the steps 203 through 212 from Example 1, where the Wang Price for Intel stock, at $133.944, was obtained at step 212. In this example, this same Wang Price for Intel stock, is obtained at step 312.

At step 313, however, the method requires a decision. Is the Wang Price for the underlying close enough to the last quoted market price? The last quoted market price for Intel stock is $133.688, which is $0.25 less than the discounted Wang Price of $133.944. Depending on the tolerance of one skilled in the art for relative lack of precision, the method allows for application of a payoff function to each variable outcome of the underlying, in step 315, or requires further iteration of the lambda value, step 314.

For the purposes of this example, the method requires further iteration of the lambda value. The provisional lambda value in Example 1 was 0.4525, based on the Sharpe Ratio. The method tweaks this provisional lambda value, at step 314, until the generated Wang Price, from steps 306-312, converges to equal the last market price of $133.688, step 313.

After trial and error, the calibrated lambda value of 0.4685 produces a Wang Price of $133.688. This satisfies step 313.

One skilled in the art may notice that the calibrated lambda value of 0.4685 is different from the Sharpe Ratio lambda of 0.4525. The calibrated lambda adjusts for the fact that the returns for the underlying Intel stock, as listed in Table 1, Column 1B, are not truly lognormal. If the returns for the underlying Intel stock were truly lognormal, the Sharpe Ratio value for provisional lambda would produce a discounted Wang Price equal to the last market price.

A calibrated change in lambda value produces calibrated changes in Table 5, as shown in the cumulated probabilities of Column 2D, transformed probabilities of Column 5A, and distorted probability weights of Column 5B, when compared to those in Example 1.

With the calibrated lambda of 0.4685, the method has already completed the steps to finding a discounted Wang Price for the underlying Intel stock, as found in the bottom of Column 5C.

The method then moves to application of the payoff function to the prospective future cashflow outcomes of the underlying, step 315. In Table 5, the payoff function of MAX(140−X,0) is applied to the prospective future cashflow outcomes of Column 2B, as X, with all outputs generated in Column 5D.

For example, the prospective future cashflow outcome of $109.442 minus the $140 call price, is a negative number, so the MAX(140−X,0) payoff function generates a 0 value.

The prospective future cashflow outcome at the bottom of Column 2B, of $172.379, minus the $140 call price, is a positive number of $32.38, so the MAX(140−X,0) payoff function generates a $32.38 value. With all outputs generated in Column 5D, this satisfies step 315.

The method then moves to step 316, multiplying the payoff values to their distorted probability weights. In Table 5, the payoff values are found in Column 5D, and the distorted probability weights are found in Column 5B. When they are multiplied together, they generate outputs in Column 5E.

For example, the contingent payoff value of $0.00 at the top of Column 5D, can be multiplied to the distorted probability weight 0.1033 at the top of Column 5B, to equal a weighted value of $0.00 at the top of Column 5E.

At the bottom of the respective columns, however, the contingent payoff value of $32.38 is multiplied to the distorted probability weight of 0.0139, to equal a weighted value of $0.450. With all outputs generated in Column 5E, this satisfies step 316.

The method now moves to step 317, where the weighted values for the contingent payoff are added together, to obtain a Wang Price. In Table 5, the weighted values of Column 5E are added together, to equal $4.537, which is the undiscounted Wang Price for the option in 1 month. This satisfies step 317.

The method is completed by discounting the Wang Price for the option by the risk-free interest rate, step 318. The risk-free interest rate of 1 month is 0.005833, as obtained from the calculation of the Sharpe Ratio in step 206. Multiplying the Wang Price of $4.537 by 0.005833, the method gets $0.027, which is further subtracted from $4.537 to obtain a discounted Wang Price of $4.510, as shown on the very bottom of Column 5E. This satisfies step 318, and obtains the discounted Wang Price as processed through FIG. 3, step 319. This completes FIG. 3. This completes Example 2.

One skilled in the art may notice that the discounted Wang Price for the option is $4.510, and the discounted Black-Scholes price for the same option is $4.171. The Wang Price adjusts for the fact that the returns for the underlying Intel stock, as listed in Table 1, Column 1B, are not truly lognormal. If the returns for the underlying Intel stock were truly lognormal, the Sharpe Ratio value for provisional lambda would produce a discounted Wang Price, equal to the Black-Scholes price.

The invention calibrates an accurate option price for an underlying financial instrument, regardless of whether that instrument has a normal or non-normal set of prospective future cashflow outcomes. This calibration of an accurate option price is a useful data result of the invention.

The method of the process for FIG. 3 can be used to obtain a price, after adjustment for risk, for contingent payoffs on any other traded underlying risk vehicle, consisting of any group of one or more assets or liabilities, such as options on stocks or other equity securities, options on bills, bonds, notes, or other debt securities, options on currencies of various countries, options on commodities of physical, agricultural, or financial delivery, options on asset-backed or liability linked securities or contractual obligations, and options on weather derivatives and other observable physical phenomena whose outcomes can be linked to financial outcomes.

The Wang Price, after discounting, is a useful data result, or output, because it represents the present fair value of an underlying risk vehicle for any grouping of one or more assets or liabilities. This present fair value can be compared to the present fair value of other underlying risk vehicles, on an even playing field, so that risk management professionals can identify, monitor, acquire, and dispose of underlying risk vehicles according to expected portfolio risks and returns.

Example 3

Finding the Market Price of Risk for a Bond Subject to Rating Migration

For the third example of this method, refer to Table 8, which provides a series of outcomes for a BBB-rated corporate bond, whose coupon rate is at 6%, with the risk-free interest rate at 5%. The rating for the BBB bond may migrate over one year, to AAA, at best, or to Default, at worst, as shown in Column 8A. Regardless of the future rating, the prospective future cashflows for the coupon rate on this bond remains at 6%, unless the bond falls into default, as shown in Column 8B. The prospective forward prices for the bond in one year, given the prospective change in rating, is shown in Column 8C. With the added value of coupon payment, at 6% of the $100 book value, the total forward values of the bond are shown in Column 8D. The various probabilities attached to the migrations are shown in Column 8E.

The corporate bond is a traded underlying risk vehicle, so the method of the invention turns to FIG. 4 to find the "market price of risk" for the underlying risk vehicle—consisting of a single asset, namely the corporate bond—at some point in the future. This "market price of risk" is a useful data result, because it can be compared favorably, or unfavorably, to the "market price of risk" of other underlying risk vehicles, having otherwise similar expected returns. Under the process of this invention, iterating the "market price of risk" is used to discount the future Wang Price, until the discounted Wang Price equals the last market price for that underlying risk vehicle.

In FIG. 4, the method starts by determining the objective of the process. The objective of the process is to find the "market price of risk" for the future value of the underlying risk vehicle in question, 401. The future value of the corporate bond 1 year from the time of the last market quote is the objective. This satisfies steps 401, where the particular future date has been described, by a horizon date of 1 year, and 402, where the selection of a traded underlying risk vehicle has been described, by the corporate bond.

The method next selects a table of future prospective outcomes, whose projected cashflow values have assigned probabilities, step 403. The selected table of prospective cashflow future outcomes and respective probabilities is found in Table 8, in Columns 8D and 8E. This satisfies step 403.

The method next sorts these prospective cashflow future outcomes, and respective probabilities, in ascending order, from lowest to highest, step 404. These sorted outcomes, with their respective probabilities still attached, are shown in Table 9, Columns 9A and 9B. This satisfies step 404.

The method next cumulates the sorted probabilities so that the last probability equals the number one, step 405. These cumulated probabilities are shown in Column 9C. The cumulated probability for the last sorted outcome, 109.37, equals the number 1. This satisfies step 405.

The method next selects a lambda value, as the "market price of risk." This selection is a provisional value, which will be reselected by the method again and again, by iteration, until the discounted Wang Price converges to equal the $100.00, the last market price for the bond.

One skilled in the art perceives that the returns in Table 9 are not lognormal, so that the Sharpe Ratio can only provide a provisional, or starter, lambda value. For the purposes of this example, the Sharpe Ratio, is the average of weighted bond returns for the year, minus the average risk-free rate for the year, all divided by the average standard deviation of the weighted bond returns for the year.

One skilled in the art is able to compute these values from the prospective future cashflow outcomes, and their respective probabilities, to get 0.0709 for the average bond return for the year, and obtain an average risk-free rate of 0.0500 for the year. The average standard deviation of the bond returns for the year is 0.0299. The Sharpe Ratio, is calculated as (0.0709–0.0500)/0.0299 to equal a "market price of risk" of 0.6980, under the assumption of lognormal returns. Lambda thus equals 0.6980, for now. This satisfies step 406.

The method next applies the core process, or kernel, of the Wang Transform, to the cumulated probabilities, step 407. The Wang Transform is found in FIG. 1, but one skilled in the art using Excel can summarize the entire kernel with a line of combined code, as follows:

COLUMN_9D=NORMDIST(NORMINV(COLUMN_9C,0,1)+LAMBDA,0,1,1))

The core process of the Wang Transform starts by taking the cumulated probabilities of a distribution, as found in Table 9, Column 9C. Column 9C appears on the innermost parenthesis of the above equation. This satisfies step 102.

The method on FIG. 1 then applies an inversion of the standard normal distribution to all of the cumulated probabilities of the distribution, 103. The inversion of a standard normal distribution can be generated in many computer programming languages, but we list the Excel function of NORMINV, as applied to each of the cumulated probabilities.

The NORMINV is applied to (COLUMN_9C) followed by the parameters 0,1. This satisfies step 103.

The method on FIG. 1 then follows step 104, by taking the expression of (NORMINV(COLUMN 9C,0,1)), and applies a shift, by the selected lambda value of step 406. The value of 0.6980 is thus added to the (NORMINV(COLUMN 9C,0,1)). This satisfies step 104.

The method on FIG. 1 then follows step 105, by applying the normal distribution to each of these shifted results. We apply the Excel function of NORMDIST to the expression NORMINV(COLUMN_9C,0,1)+LAMBDA, followed by the parameters 0,1,1 to get a complete kernel, or core process, expression of:

NORMDIST(NORMINV(COLUMN_9C,0.1)+LAMBDA,0,1,1).

For example, in Table 9, the Wang Transform of the first cumulated probability of 0.0018, as shown in Column 9C, is 0.0134, as shown in Column 9D. The Wang Transform of the last cumulated probability of 1.0000, as shown in Column 9C, is 1.0000, as shown in Column 9D.

This column of transformed cumulative probability weights, in Column 3C, satisfies step 105. The cumulative probability weights have been transformed by the core process of the Wang Transform, step 106, completing the core process, or kernel, of FIG. 1.

The method moves away from the completed core process, or kernel, of the Wang Transform in FIG. 1, and back to FIG. 4, to decumulate the transformed probability weights, step 408. In Table 9, the transformed probability weights, as shown in Column 9D, are decumulated, as shown in Column 9E. For example, the transformed probability weight at the top of Column 9D, 0.0134, is decumulated to 0.0134, at the top of Column 9E. But the transformed probability weight at the bottom of Column 9D, 1.0000, is decumulated to 0.00001, as shown at the bottom of Column 9E. This satisfies step 408.

Notice that the new probability weights are distorted from their original probability weights, because of the effects of the kernel, or core process, of the invention, the Wang Transform. These distortions are due to our selection of the lambda value.

In FIG. 4, the method moves from decumulation to immediate application of the payoff function. This payoff function is the underlying bond itself. One skilled in the art understands that an underlying asset can be viewed as a contingent payoff, with a resulting contingent cash value amount identical to that of the underlying cash value.

The applied payoff function is in Table 9, in Column 9F, and is identical to the prospective values of Column 9A. For example, the worst prospective future cashflow outcome is $51.13, at the top of Column 9A, which is also the worst prospective payoff function value, at the top of Column 9F. This satisfies step 409.

The payoff function values from Column 9F are now multiplied to their new probability weights, 9E, to provide results in Column 9G, step 410. For example, the top payoff function value in Column 9F, $51.13, is multiplied to the top new probability weight in Column 9E, 0.01344, to equal the top weighted value in Column 9G, $0.687. This is the value contribution of the default outcome in 1 year, to the provisional Wang Price of the bond. One trained in the art understands that the $83.222 value in Column 9G, represents the value contribution of the BBB-rating outcome in 1 year, to the provisional Wang Price of the bond. This satisfies step 410.

The method now adds all of these weighted values in Column 9G to obtain a provisional Wang Price for 1 year from now, step 411. This price is $105.38. This satisfies step 411.

The method then moves to discount the provisional Wang Price by the risk-free interest rate, 412. The risk-free interest rate is 0.0500 for 1 year, and so the price of $105.38 is discounted to $100.37, which is the present value of the provisional Wang Price. This satisfies step 412, and provides the Wang Price for the contingent payoff of the underlying, 413.

At step 414, however, the method requires a decision. Is the Wang Price for the contingent payoff close enough to the last quoted market price for that contingent payoff? The last quoted market price for the bond was $100.00, which is $0.37 less than the discounted Wang Price of $100.37. Depending on the tolerance of one skilled in the art for relative lack of precision, the method allows an end to the process, or, for further iteration of the lambda value, step 415.

For the purposes of this example, the method in FIG. 4 requires further iteration of the lambda value. The provisional lambda value in Table 9 was 0.6980, based on the Sharpe Ratio. The method tweaks this provisional lambda value, at step 415, until the generated Wang Price, from steps 406-413, converges to equal the last market price of $100.00, step 414, before ending. After trial and error, the calibrated lambda value of 0.788 produces a discounted Wang Price of $100.00. The effects of calibrating lambda to 0.788 is shown in Table 10, with each of the columns representing the steps of 406-412. This satisfies step 414, and completes FIG. 4, step 416. This completes Example 3.

The calibrated market price of risk for the bond, as generated by the invention, is different than the Sharpe Ratio, because the weighted distributions of prospective future cashflow outcomes does not exhibit lognormal returns. One skilled in the art is able to multiply Columns 8D and Columns 8E, and adding the weighted values, to get a mean expectation for the return of the bond, $107.28. All other things being equal, a bond with a mean expected return of $107.28, but with a low lambda value, like 0.3, is less uncertain, than a bond with the same return, but with a higher lambda, like 0.5.

The invention calibrates an accurate "market price of risk" for a financial instrument, regardless of whether that instrument has a normal or non-normal set of prospective future cashflow outcomes. This calibration of the accurate "market price of risk" is a useful data result, for the purposes of portfolio risk management.

With the calibration of an accurate "market price of risk," the process of FIG. 4 can also be used to price the prospect of bond, loan, or mortgage default, or the prospect for a defaulted bond, loan, or mortgage to recover and resume payments. Fractionated probabilities for the prospective future cashflow outcomes can be further refined, or segregated, to reflect variations in the estimations of recovery from default. The process of FIG. 4 can also be used to price the securitizations of credit card, mortgage, loan, or other account receivables.

With the calibration of an accurate "market price of risk," the process of FIG. 4 can be used to obtain a price, after adjustment for risk, for catastrophe bonds, where the scheduled coupon payments and principal payments may be reduced due to a specified catastrophic event.

The process of FIG. 4 can also be used to price the prospect of default, or the prospect for a defaulted bond to recover and resume payments. Fractionated probabilities for the prospective future cashflow outcomes can be further refined, or segregated, to reflect variations in the estimations of recovery from default.

The output of the Wang Price, after discounting, is a useful data result, because it represents the present fair value of an underlying risk vehicle consisting of a group of one or more assets or liabilities. This present fair value of the underlying risk vehicle can be compared to that of other underlying risk vehicles, on an even playing field, so that risk management professionals can identify, monitor, acquire, and dispose of underlying risk vehicles according to expected portfolio risks and returns.

Example 4

Finding the Fair Value for an Underwritten Catastrophe

For the fourth example of this method, refer to Table 11, which provides a series of outcomes for a Richter Scale earthquake event for some populated epicenter, in Column 11A, with payments contracted for the first of any such event over 1 year, according to degree of severity, in Column 11B. Any payout will be paid at the end of the year. Prospective future cashflow outcomes remain at $0.00, if all Richter Scale events remain below 6.00 for the year. The payouts begin with $100.00 for the first Richter Scale event of 6.00 or higher, with a capped payout of $2741.83 for a first Richter Scale event of 7.00 or greater. The various probabilities attached to Richter Scale severity are shown in Column 11C.

The earthquake contract is an underwritten risk with a contingent payout, so the method of the invention turns to FIG. 5 to find the fair price for the contract at some point in the future.

In FIG. 5, the method starts by determining the objective of the process. The objective of the process is to find the Wang Price for the future value of the underlying risk vehicle in question, 501. The fair value of the earthquake contingency contract in 1 year, from the perspective of a Small Insurance Company, is the objective. Such a fair value, in the insurance world, is called a pure premium. The pure premium would be charged by the Small Insurance Company, to break even on the standalone cost of the contract, after an adjustment for risk.

This satisfies steps 501, where the particular future date has been described, by a horizon date of 1 month, and 502, where the selection of underwritten liabilities has been described, by an earthquake contingency contract, with payouts described in Table 11, as offered by Small Insurance Company.

The method next selects a table of future prospective outcomes, whose projected cashflow values have assigned probabilities, step 503. The selected table of prospective future cashflow outcomes and respective probabilities is found in Table 11. The prospective future cashflow outcomes are found in Column 11B, and their respective probabilities are found in Column 11C. This satisfies step 503.

The method then moves to sort the entire table of outcomes by ascending cashflow values, from lowest cashflow value to highest cashflow value, step 504. These sorted cashflows, and their respective probabilities, are shown in Table 12. For example, the lowest cashflow value, at the top of Column 12A, is $0. This cashflow is paid out if there is no earthquake measuring at 6.0 or greater on the Richter Scale. The highest cashflow value, at the bottom of Column 12A, is $271.83. This cashflow is paid out for the first of any earthquakes measuring 7.0 or greater on the Richter Scale. This satisfies step 504.

The method then moves to cumulate the sorted probabilities so that the last probability equals the number 1, step 505. The cumulated probabilities are shown in Column 12C. This satisfies step 505.

The method now selects a lambda value, step 506, for the "underwriting load of risk." This "underwriting load of risk" is the negatively signed version of the "market price of risk." The prospective future cashflow amounts are paid out, and not received in, because the earthquake contingency contract is a liability. The fair value for the liability will be the pure premium received in to cover these payouts, after adjusting for risk.

For the purposes of this example, the method selects a lambda value of −0.3, to indicate the underwriting load of risk. This lambda value is selected by Small Insurance Company from available records of earthquake experience and prevailing market rates for pricing insurance. This satisfies step 506.

The method next applies the kernel, or core process, of the Wang Transform to the probability weights, to create new probability weights, step 507. This kernel can be found in FIG. 1. The method on FIG. 1 follows steps 101-106, by applying the expression of: NORMDIST(NORMINV(COLUMN_12C,0,1)+LAMBDA,0,1,1)). The transformed probability weights are shown in Column 12D. This satisfies all of the steps of FIG. 1 in the Wang Transform kernel. This satisfies step 507.

The method then decumulates the transformed probability weights into distorted probability weights, step 508. The decumulated probability weights are shown in Column 12E. This satisfies step 508.

The method next multiplies the prospective future cashflow values to their new probability weights, step 509. The prospective future cashflow values are shown in Column 12A. The new probability weights are shown in Column 12E. The weighted values of the payoffs are shown in Column 12F. This satisfies step 509.

The method then sums all of the weighted values to get an undiscounted Wang Price, step 510. These weighted values equal $59.05, as shown at the bottom of Column 12F. This price is the undiscounted Wang Price. This satisfies step 510.

The method next discounts the Wang Price by the risk-free interest rate, step 511. For the purposes of this example, the risk-free interest rate is 0.07, and so the discounted Wang Price equals $55.18. This is the fair value for the earthquake contingency contract. This satisfies step 511, and completes the first part of the process of FIG. 5, at step 512. This completes Example 4.

One skilled in the art may calculate the difference between the mean expected payout of the earthquake contingency contract, and the fair price, after adjustment for risk, for that contract. The mean expected payout for the contract is found by multiplying the prospective future cashflow outcomes, as found in Column 12A, by their respective original probability weights, as found in Column 12B, and then summing up their weighted values. The mean expected payout for the contract is thus $35.77. This is almost $20 less than the fair value for the contract, after adjustment for risk.

The process of FIG. 5 can also be used to price underwritten liabilities in credit, insurance, and pensions, where a certain amount of breakeven money needs to be received by the underwriter assuming the liabilities.

The Wang Price, after discounting, is a useful data result, because it represents the present fair value of an asset or liability. This present fair value can be compared to the present fair value of other financial instruments, on an even playing field, so that risk management professionals can identify, monitor, acquire, and dispose of underlying risk vehicles consisting of a group of one or more assets and liabilities according to expected portfolio risks and returns.

Example 5

Finding the Fair Value for a Reinsured Layer of an Underwritten Catastrophe

For the fifth example of this method, refer to Table 13, which provides the same series of prospective future cashflow outcomes, and respective probabilities, as the last example.

The underwritten risk is the transfer of a specific layer of the earthquake contingency contract, from Small Insurance Company, to the Very Large Reinsurer, so that all contracted payouts in excess of $200 are reinsured. This reinsured layer is a contingent payout for an underwritten risk, with the function MAX(X−200,0), so the method of the invention turns to the process in FIG. 5 to find the fair price for the reinsured layer.

In FIG. 5, the method starts by determining the objective of the process. The objective of the process is to find the Wang Price for the future value of the contingent payout in question, 501. The fair value of the reinsured layer in 1 year, from the perspective of a Small Insurance Company, is the objective. This satisfies step 501.

The process in FIG. 5 covers the Wang Price for the underlying underwritten contract, which is covered in steps 501 to 512. The underwritten underlying risk vehicle is the same earthquake contingency contract that was priced in Example 4. The discounted Wang Price for this contract was $55.18, as found in step 512 of the Example 4 process.

The method then moves from step 512 in this Example 5 process, to step 513. At step 513, however, the method requires a decision. Is the Wang Price for the underlying close enough to the other pure premiums for similar underwritten liabilities? The last quoted market price for earthquake contingency contracts, for similar payouts, was indeed near $55.18. Depending on the tolerance of one skilled in the art for relative lack of precision, the method allows for application of a payoff function to each variable outcome of the underlying, in step 515, or requires further iteration of the lambda value, step 514.

For the purposes of this example, this Wang Price is indeed close enough, satisfying step 513.

The method next moves to step 515, by applying the payoff function to the underlying underwritten liability. The payoff function is MAX(X−200,0) to the projected future cashflow outcomes of the earthquake contingent contract. These outcomes are shown in Column 12A. The result of applying the payoff function to these outcomes is shown in Column 13A.

For example, the projected future cashflow outcome at the top of Column 12A is $0.

After applying the payoff function of MAX(Column_12A−200,0), the contingent payoff at the top of Column 13A is $0.

The projected future cashflow outcome at the bottom of Column 12A, however, is $271.83. After applying the payoff function of MAX(Column_12A−200,0), the contingent payoff at the bottom of Column 13A is $71.83.

With the payoff function completed in Column 13A, this satisfies step 515.

The method now moves to multiply the contingent cashflow values to their new probability weights, step 516. In Table 13, the contingent cashflow values, as found in Column 13A, are multiplied to their respective new probability weights, as found in Column 12E. One skilled in the art remembers that these probability weights were first generated in Example 4, in step 508, as a result of applying lambda to the get the calibrated Wang Price for the underlying underwritten earthquake contingency contract.

As an example of step 516, the contingent payoff at the top of Column 13A is $0. The distorted probability at the top of Column 12E is 0.7060. By way of multiplication, the resulting weighted payoff is $0, at the top of Column 13B.

The contingent payoff at the bottom of Column 13A, however, is $71.83. The distorted probability at the bottom of Column 12E is 0.1194. By way of multiplication, the resulting weighted payoff is $8.58, at the bottom of Column 13B.

With the weighted values completed in Column 13B, this satisfies step 516.

The method then moves to sum the weighted values to get an undiscounted Wang Price for the reinsured layer, step 517. In Table 13, the weighted values add up to $9.41, as found below the bottom of Column 13B. This is the undiscounted Wang Price. This satisfies step 517.

The method now moves to discount this Wang Price by the risk-free interest rate, step 518. With a risk-free interest rate of 0.07, the discounted Wang Price is $8.79. This is the fair value for the reinsured layer of the earthquake contingency contract, covering any payout for that contract, that exceeds a payout of $200. Small Insurance Company would pay the Very Large Reinsurer this amount of money, as a pure premium for taking on this layer of liability. This satisfies step 518, and completes the second part of the process of FIG. 5, at step 519. This completes Example 5.

One skilled in the art may notice that the discounted Wang Price for the reinsurance layer is $8.79, but that there is no discounted Black-Scholes price considered for the reinsurance layer. To one skilled in the prior art, using a Black-Scholes model to price a slice of a non-normally distributed earthquake contract would not make sense. The example provides no time series of varying outcomes and returns, to produce a volatility parameter. The authoritative example provides no way to execute a riskless hedge against the reinsured layers during the term of the contract. A Black-Scholes model would not provide a meaningful basis for pricing such a reinsurance contract.

The invention calibrates an accurate option price for an underlying financial instrument, regardless of whether that instrument has a normal or non-normal set of prospective future cashflow outcomes, and regardless of whether that instrument is an asset or liability, and regardless of whether that instrument is traded or underwritten. This calibration of an accurate option price is a useful data result of the invention.

The invention calibrates an accurate contingent price for an underlying financial instrument, regardless of the structure of the contingent payoff, option, or payoff function. This calibration of an accurate contingent price, regardless of the structure of the contingency, is a useful data result of the invention.

As an alternative to this example, a reinsurance layer may be priced by exceedence probabilities. An exceedence probability is the overall probability that the future value of an underlying risk vehicle will exceed a certain amount of money, in terms of either gains as an asset, or losses as a liability. Exceedence probabilities are used frequently in underwriting financial obligations in insurance, credit, health care, and pensions, and especially in catastrophe insurance pricing.

In Table 12, the exceedence probabilities for the earthquake contingency contract are provided in a new Column 12C. One skilled in the art understands that exceedence probabilities may be generated by subtracting the cumulations preceding and including the probability weights at hand from a probability of certainty, or 1. Columns 12A and 12B show the results of the method for the previous example, steps 501-504, but with exceedence probabilities in step 503 in place of the cumulated probabilities. This is because exceedence probabilities are themselves generated cumulations.

For example, the exceedence probability for the top probability weight in Column 12B is 0.8000. The cumulations preceding and including the probability weights at hand is also 0.8000. The exceedence probability for this layer, is therefore 1 minus 0.8000, or 0.2000, as shown at the top of New Column 12C.

The exceedence probability for the next probability weight in Column 12B is 0.02000. The cumulations preceding and including the probability weights at hand is 0.8000 plus 0.02000, or 0.82000. The exceedence probability for this later, is therefore 1 minus 0.82000, or 0.18000, as shown at the top of New Column 12C.

These exceedence probabilities are the results of a cumulation, step 505, and a lambda value of −0.3 selected, step 506. The method moves next to transform these cumulated exceedence probabilities, under the kernel, or core process, of the Wang Transform, as shown in FIG. 1, steps 101-106. After decumulation, FIG. 5, step 508, the distorted probability weights are shown in Column 12E. For example, the top distorted probability weight of column 12E is 0.7060. This satisfies steps 506-508.

The original cashflow values in Column 12A can be multiplied by their new respective probability weights, step 509. For example, the payout amount at the top of Column 12A is $0, and the distorted probability at the top of Column 12E is 0.7060. The weighted payoff at the top of Column 12F is $0.00.

But the payout amount at the bottom of Column 12A is $271.83, and the distorted probability at the bottom of Column 12E is 0.1194. The weighted payoff at the bottom of Column 12F is therefore $32.47. This $32.47 is the undiscounted price of the cost of a probability layer in a reinsurance contract. The probability layer that is priced is the probability that an earthquake will be at least 7.0 on the Richter Scale. One skilled in the art can discount the $32.47 by the risk-free interest rate, to obtain the fair value for assuming this probability layer of severe outcome. This probability layer is called an excess of severity layer, because it a layer that is paid only when the severity of an earthquake is in excess of 7.0 on the Richter Scale.

The method of the process for FIG. 5 can be used to obtain a price, after adjustment for risk, for contingent payouts of underwritten assets and liabilities, such as stop-loss layers, probability layers, excess of severity layers, or excess of loss layers, in reinsurance, or to price options, contingencies, slices, or provisions in underwritten liabilities in credit, insurance, and pensions, where a certain amount of breakeven money needs to be received by the party assuming the underwritten or contingent risks.

The method of the process for FIG. 5 can also be used to obtain a price, after adjustment for risk, for contingent payoffs for other physical or natural variables, such as for weather derivatives, where pre-defined payoffs are functions of observed and measured events in temperature, wind speed, earthquakes, flooding, and other nominal events, or other catastrophes.

The Wang Price, after discounting, is a useful data result, because it represents the present fair value of an asset or liability. This present fair value can be compared to the present fair value of other financial instruments, on an even playing field, so that risk management professionals can identify, monitor, acquire, and dispose of assets and liabilities according to portfolio risks and returns.

Example 6

Finding the Fair Value for an Underwritten Underlying Risk Vehicle Whose Prospective Future Values can be Either Negative or Positive For the sixth example of this method, refer to Table 6, which provides a series of outcomes in 1 year for a special kind of underlying risk vehicle. A risk vehicle can have a wide range of prospective future cashflow outcomes, including possible negative values or possible positive values, for the same future point in time. A blended risk vehicle, providing outcomes both of an asset and of a liability, presents a special difficulty to pricing methods of the prior art.

The risk vehicle in question is a medical insurance policy, for sale on an insurance exchange, with ten known prospective future cashflow outcomes for the underwritten policy, reflecting various possibilities of earned premiums minus incurred losses. Because the underlying is a traded risk vehicle of policy outcomes, the method of the invention again turns to FIG. 3, to find the fair value for the collection of policy outcomes at some point in the future. Under the process of this invention, for FIG. 3, this pricing is obtained by generating a useful data result for the prospective outcomes of the underlying policy, called the Wang Price, as shown in Table 6.

Table 6 provides the series of prospective outcomes in 1 year for a medical insurance policy, in Column 6A. Is the risk vehicle an asset or a liability? One skilled in the art determines that the risk vehicle of policy outcomes represents an asset, because the prospective future cashflow values, negative and positive, as shown in Column 6A, after being multiplied by their respective probability weights in Column 6B, and summed, into a mean of expected returns, is a positive number. This positive number is $6.50. The risk vehicle is thus an asset, and the lambda value calibrating its fair value, will be positive. One skilled in the art understands, however, that if the mean of expected returns was negative, the risk vehicle would be a liability, and the lambda value calibrating any fair value, would be negative.

In FIG. 3, the method starts by determining the objective of the process. The objective of the process is to find the Wang Price for the future value of the traded risk vehicle, at 301. This satisfies steps 301, where the particular future date has been described, by a horizon date of 1 year, and 302, where the selection of a traded underlying instrument has been described, by the traded medical insurance policy risk vehicle.

The medical insurance policy risk vehicle, as underwritten, has a discounted mean of expected returns of $6.05, because the mean of expected returns of $6.50 in 1 year must be reduced by the risk-free interest rate of 0.07. But on the insurance exchange, the medical insurance policy risk vehicle is being traded at $1.96. This difference, between the mean of future expectations, and the fair value, after adjustment for risk, is substantial. It reflects the fact that if the medical insurance policy risk vehicle experiences one of the negatively valued outcomes, the holder of that risk vehicle must pay out that outcome in full to the policyholders.

The method then moves to select a table of prospective future cashflow outcomes, and their respective probabilities, step 303. The method then moves to sort the table of prospective future cashflow outcomes, and their respective probabilities, step 304. In Table 6, these steps have already been taken, in Columns 6A and 6B. When pricing an asset, the lowest cashflows are the largest negative values, and the highest cashflows are the largest positive values, sorted in ascending order. This satisfies steps 303 and 304.

The method then cumulates the probabilities, as shown in Column 6C, satisfying step 305.

The method now selects a lambda value, as the "market price of risk" for the risk vehicle. The provisional "market price of risk" is calculated here by assuming a normal distribution of underwritten income, and using the Sharpe Ratio. The expected income for the risk vehicle in 1 year is $6.50, but the market price for this risk vehicle is $1.96. Thus the expected return for the risk vehicle over 1 year is 2.316, or 231.6% and the standard deviation of return is 26.295, or 2629.5%. With the risk-free interest rate at 0.07, or 7%, the Sharpe Ratio is 2.316-0.07 all divided by 26.295, or 0.0854. This lambda value of 0.0854 satisfies step 306.

One skilled in the art follows the steps 307-312, as shown in previous example, and whose key results are shown in Table 6, as a series of transformed cumulated values, in Column 6D, a series of decumulated probability weights, in Column 6E, and a series of weighted values, in Column 6F. These weighted values are summed to produce a Wang Price of $2.76, and a weighted Wang Price of $2.58. This satisfies steps 307-312.

At step 313, however, the method requires a decision. Is the Wang Price for the risk vehicle close enough to the last quoted market price? The last quoted market price for the risk vehicle is $1.96, which is $0.62 less than the discounted Wang Price of $2.58. Depending on the tolerance of one skilled in the art for relative lack of precision, the method allows for application of a payoff function to each variable outcome of the underlying, in step 315, or requires further iteration of the lambda value, step 314.

For the purposes of this example, the method requires further iteration of the lambda value. The provisional lambda value was 0.0854, based on the Sharpe Ratio. The method tweaks this provisional lambda value, at step 314, until the generated Wang Price, from steps 306-312, converges to equal the last market price of $1.96, step 313. After trial and error, by one skilled in the art, the calibrated lambda value of 0.10 produces a Wang Price of $1.96, as shown in Column 7C of Table 7. This satisfies step 313, and completes the first part of the process for FIG. 3, at step 312. This completes Example 6.

One skilled in the art understands that the lambda value was deliberately iterated so that the Wang Price converged to equal the prevailing market price for the risk vehicle, $1.96. Without a prevailing market price for the risk vehicle, however, the lambda value must be inferred or implied from similar risk vehicles, in order to find a fair value.

In accounting, finance, underwriting, and trading, the prior art is deficient in having a method for providing a fair value, with adjustment for risk, for risk vehicles whose overall prospective future cashflow outcomes were mixes of negative, positive, zero, or infinitesimal numbers. Any fair value for these mixes is rendered not meaningful. The invention, however, calibrates an accurate price for risk vehicles experiencing these mixes of negative, positive, zero, or infinitesimal outcomes. This calibration is a useful data result of the invention.

In accounting, finance, underwriting, and trading, the prior art is deficient in having a method for providing a fair value, with adjustment for risk, for risk vehicles whose history of cashflow outcomes drifted between negative, positive, zero, or infinitesimal numbers. Any fair value for these drifts is rendered not meaningful. The invention, however, calibrates an accurate price for risk vehicles experiencing these drifts of negative, positive, zero, or infinitesimal outcomes. This calibration is a useful data result of the invention.

In accounting, finance, underwriting, and trading, the prior art is deficient in method for providing a fair value, with adjustment for risk, for risk vehicles that were underwritten, with prospective future cashflow outcomes based on the future experience of assumed obligations, and that were simultaneously traded, with forward prices exchanged for future prospective values. The invention, however, calibrates an accurate price for risk vehicles that are both underwritten and traded at the same time.

The Wang Price, after discounting, is a useful data result, because it represents the present fair value of an asset or liability. This present fair value can be compared to the present fair value of other financial instruments, on an even playing field, so that risk management professionals can identify, monitor, acquire, and dispose of underlying risk vehicles, each of which is a group consisting of one or more assets and liabilities, according to expected portfolio risks and returns.

Example 7

Finding the Fair Value for a Contingent Payoff for an Underlying Risk Vehicle Whose Prospective Future Values can be Negative or Positive For the seventh example of this method, refer to Table 7, which provides a series of outcomes in 1 year for a special kind of underlying risk vehicle, already explored in Example 6. Under the process of this invention, by following the steps in FIG. 3, the fair value of the risk vehicle was found to be $1.96, equal to the last market price for the risk vehicle. This fair value was discovered by applying a lambda value for the distribution of the underlying risk vehicle, of 0.10, which was substantially different than that of the lambda value that would have been derived from a Sharpe Ratio.

Table 7 provides the series of prospective outcomes in 1 year for the medical insurance policy, in Column 6A. The risk vehicle has prospective future cashflow outcomes that are both negative and positive. For this example, the method calculates the fair value of a put option with a strike price of $0.00. The payoff function for this put option is:

MAX(−Column_6A,0), that is, the maximum of either the negative of a prospective future cashflow value, which itself would be negative, or zero.

Table 7 provides the series of prospective outcomes in 1 year for the medical insurance policy, in Column 6A. The risk vehicle has prospective future cashflow outcomes that are both negative and positive. For this example, the method calculates the fair value of a put option with a strike price of $0.00. The payoff function for this put option is: MAX(−Column 6A),0), that is, the maximum of either the negative of a prospective future cashflow value, or zero.

In FIG. 3, the method starts by determining the objective of the process, step 301. The objective of the process is to find the Wang Price for the value of a put option for the above risk vehicle, with a strike price of 0, in 1 year. This satisfies steps 301, where the particular future date has been described, by a horizon date of 1 year, and 302, where the selection of a traded underlying instrument has been described, by the traded medical insurance policy risk vehicle. This risk vehicle has already been priced, by the invention, at a fair value of $1.96.

The method then moves to apply a payoff function to the prospective future cashflow outcomes of the underlying, as found in Column 7C, step 309. The results of this payoff function are shown in Column 6A. For example, the prospective future cashflow outcome at the top of Column 6A, $−123, is taken by the payoff function MAX(−Column_6A,0), to produce a positive payoff function of $123. This is because the strike price of $0, minus the risk vehicle outcome of $−123, is worth a positive $123. With the payoff function applied to all of the prospective future cashflow outcomes, as found in Column 7C, this satisfies step 315.

The method now multiplies the payoff values to their new probability weights, step 316.

In Table 7, this means that the distorted probabilities of Column 7B, are multiplied to the payoff values of Column 7D. For example, the distorted probability at the top of Column 7B is 0.1187. The payoff value for that probability at the top of Column 7D is $123. These are multiplied to produce a weighted payoff at the top of Column 7E, which is $14.60. With all of the weighted payoffs filling Column 7E, this satisfies step 316.

The method next sums all of the weighted payoffs filling Column 7E, to get an undiscounted Wang Price, step 317. The sum of these weighted payoffs is $17.88, as shown below the bottom of Column 7E. This is the undiscounted Wang Price. This satisfies step 317.

The method then discounts this Wang Price by the risk-free interest rate, step 318. The risk-free interest rate is 0.07, or 7.00%, annually. The Wang Price of $17.88 is reduced by 7.00% to $16.71. This satisfies step 318, and completes the second part of the process for FIG. 3, at step 314. This completes Example 7.

One skilled in the art would notice that fair value for the put option, at $16.71, is greater than the fair value of the underlying risk vehicle, at $1.46. This reflects the fact that the underlying risk vehicle has a significant degree of prospective negative value, in the form of only-negative outcomes, embedded within the overall slight positive value, reflecting all of the negative and positive outcomes, averaged together.

In accounting, finance, underwriting, and trading, the prior art is deficient in having a method for providing a fair value, with adjustment for risk, for underlying risk vehicles whose options, contingent payoffs, or payoff functions, are worth more than the underlying risk vehicles. Any comparative fair value between such an underlying and its derivative was rendered not meaningful. The invention, however, calibrates an accurate price for underlying risk vehicles whose options, contingent payoffs, or payoff functions, are worth more than the underlying risk vehicles. This calibration is a useful data result of the invention.

Example 8

Finding the Fair Value for an Underlying Risk Vehicle with a Rare But Extreme Outcome For the eighth example of this method, refer to Table 15, which provides a series of two outcomes, success and failure, for a launch of a $200 million commercial satellite. The corporate owner of the satellite wants to purchase an insurance policy to pay $200 million for the destroyed satellite if the launch fails. To find the fair value of the insurance policy, the method follows the steps in FIG. 2, and, for the kernel, or core process of the Wang Transform, follows the steps in FIG. 6, to employ a two-factor pricing model.

The first factor in a two-factor pricing model is the lambda value for the "market price of risk." The second factor is the "k" number of the degrees of freedom in a Student-t distribution, for parameter uncertainty in a small sample size.

Table 15 provides the series of prospective future cashflow outcomes for the satellite launch in Column 15A. The loss amount is $0 for a successful launch, and $200 million for an unsuccessful launch. The respective probabilities for these two prospective outcomes is 0.96 and 0.04, as shown in Column 15B. Statistically, the observed population size of satellite launches is not very large. Out of 50 launches, only 2 have failed.

One skilled in the art can follow the steps 201-205 in FIG. 2, as shown in Column 15C. The method selects a lambda value of −0.2 as the "market price of risk" for insuring large equipment losses, like those of satellites, based on prevailing market prices for such policies, satisfying step 206. But the rareness of the event, combined with the severity of the loss, requires a second model factor.

The experience data for satellites is 10,000,000 times more sparse than that for auto insurance, and the uncertainty attached to the experience requires further compensation. A distribution using "k" degrees of freedom, along with lambda, compensates for this added kind of uncertainty.

The method then moves to FIG. 6, where the inversion of a standard normal cumulative distribution is applied to the original probability weights, and lambda is added, before a Student-t distribution, with a calibrated number of degrees of freedom, is applied. One skilled in the art can devise many programming approaches to this, but in Excel the following expression may be used, for the entire kernel, or core process, of the two-factor Wang Transform:

1−TDIST(NORMINV(COLUMN_15C,0,1)+ LAMBDA,K,1).

The TDIST function in Excel returns the Student-t distribution, where X is the numeric value at which to evaluate the distribution, a range of 1 to any arbitrarily large integer, for the number of degrees of freedom to evaluate the distribution, and 1 or 2, for the number of distribution tails to return.

In this expression, the inversion of standard normal cumulative distribution of the original probability weights, are first shifted by the lambda value, and then, the Student-t cumulative distribution, as reflected in 1-TDIST, is applied to this expression of shifted weights, with "k" degrees of freedom specified as an integer. The "k" degrees of freedom for this example is the integer 11. This satisfies steps 601-606 in FIG. 6. The method now moves back to FIG. 2.

The transformed probabilities are shown in Column 15D. For example, the transformed probability for no loss is 0.9254. The transformed probability for a $200 million loss is still 1.000. This satisfies step 207.

The method now moves to decumulate these probabilities, step 208. The decumulated probability for no loss is 0.9254, as shown at the top of Column 15E. The decumulated probability for a $200 million loss is 0.0746, as shown at the bottom of Column 15E. This satisfies step 208.

The method next multiplies each prospective future cashflow outcome, as found in Column 15A, with their respective distorted probability weights, as found in Column 15E. The products of these multiplications are found in Column 15F. For example, the top loss amount in Column 15A is $0. The top distorted probability of this loss amount in Column 15E is 0.9254. The weighted value from multiplying these values is the top weighted value in Column 15F, which is $0.

The bottom loss amount in Column 15A is $200 million. The bottom distorted probability of this loss amount in Column 15E is 0.0746. The weighted value from multiplying these values is the bottom weighted value in Column 15F, which is $14.93 million. This satisfies step 209.

The method then moves to sum all of the weighted values to get an undiscounted Wang Price, which is $14.93 million, satisfying step 210. This undiscounted price is the same as the discounted price, because the policy was obtained the day before the satellite launch, and paid the day after the satellite launch. This satisfies step 211, and closes the process in FIG. 2, step 212. This completes Example 8.

The Wang Price, after calibration of lambda, and calibration of the "k" degrees of freedom, and after any needed discounting, is a useful data result, because it represents the present fair value of a liability. This present fair value can be compared to the present fair value of other financial instruments, on an even playing field, so that risk management professionals can identify, monitor, acquire, and dispose of underlying risk vehicles comprised of a group of one or more assets and liabilities according to expected portfolio risks and returns.

What is claimed is:

1. A computer-implemented method for computing and outputting an indicated price, with adjustment for risk, and adjustment for parameter uncertainty, of anticipated contract obligations comprising the steps of:
    a) obtaining input identifying an underlying risk vehicle comprised of a group of one or more assets and liabilities by computer,
    b) assembling a series of potential future cashflow outcomes, consisting of cashflow values linked to their respectively paired probabilities, as a future probability distribution for the underlying risk vehicle by computer,
    c) sorting the series of outcomes by their ascending cashflow values from the lowest listed as first to the highest listed as last by computer,
    d) cumulating the respectively paired probabilities of the sorted series of outcomes so that the last such cumulated probability still linked to the highest cashflow value equals 1 by computer,
    e) providing individual inversely-mapped results for those probabilities, by applying the inversion of the standard normal distribution to all of the cumulated probabilities by computer,
    f) obtaining input selecting a lambda value as the market price of risk for the overall future probability distribution of the underlying risk vehicle by computer,
    g) adding the selected lambda value to obtain a shifted inversely-mapped result by computer,
    h) creating transformed cumulative probability weights by applying a Student-t cumulative distribution to each shifted result by computer,
    i) decumulating the transformed cumulative probability weights of the sorted series of outcomes so that the first decumulated weight equals its own cumulated weight, the second decumulated weight equals the second cumulated weight minus the first cumulated weight, the third decumulated weight equals the third cumulated weight minus the second cumulative weight, and so on, continuing until the last decumulated weight equals the last cumulated weight minus the next-to-last cumulated weight by computer,
    j) producing a set of weighted values by multiplying the cashflow values to their respective decumulated probability weights by computer, and
    k) computing and indicating an undiscounted future indicated price for the underlying risk vehicle by adding all the weighted values in the set by computer.

2. The computer-implemented method of claim 1, further comprising the application of discounting the undiscounted price by the risk-free interest rate.

3. The computer-implemented method of claim 1, further comprising the step of iterating the lambda value, so that the undiscounted price is discounted by the risk-free interest rate, and converges to equal the last recorded outcome or quoted price, of that underlying risk vehicle.

4. The computer-implemented method of claim 1, further comprising the step of iterating the number of degrees of freedom for the Student-t distribution, so that the undiscounted price is discounted by the risk-free interest rate, and converges to the last recorded outcome or quoted price, of that underlying risk vehicle.

5. The computer-implemented method of claim 1, further comprising the steps, of first, iterating the lambda value, and, of second, iterating the number of degrees of freedom for the Student-t distribution, in a sequence selected from the group consisting of:
   a) the first is iterated and fixed before the second is further iterated,
   b) the second is iterated and fixed before the first is further iterated,
   c) the first and second are iterated consecutively,
   d) the first and second are iterated simultaneously.

6. The computer-implemented method of claim 1, applying a payoff function to each projected outcome of an underlying risk vehicle, comprising the additional steps of:
   a) applying the payoff function to each projected outcome of the underlying risk vehicle,
   b) multiplying the resulting payoff values by their respective decumulated probability weights to produce a set of weighted values,
   c) adding these weighted values in the set to find an undiscounted price for the payoff function,
   d) discounting the undiscounted price by the risk-free interest rate.

7. The computer-implemented method of claim 1, wherein the underlying risk vehicle or any assets and liabilities comprising the underlying risk vehicle are traded.

8. The computer-implemented method of claim 7, wherein the traded assets and liabilities that comprise the underlying risk vehicle are selected from the group consisting of:
   a) stocks or other equity securities,
   b) bills, bonds, notes, or other debt securities,
   c) currencies of various countries,
   d) commodities of physical, agricultural, or financial delivery,
   e) asset-backed or liability-linked securities or contractual obligations,
   f) weather derivatives and other observable physical phenomena whose outcomes can be linked to financial outcomes.

9. The computer-implemented method of claim 8 wherein securitizations are backed by the traded assets and liabilities of the underlying risk vehicle.

10. The computer-implemented method of claim 8 wherein derivatives, contingent claims, and payoff functions, are based on the underlying financial instrument.

11. The computer-implemented method of claim 8 wherein the underlying risk vehicle comprises part or the whole of the basis of a published benchmark, index, or collective experience.

12. The computer-implemented method of claim 8 wherein the underlying risk vehicle is managed in a portfolio, and in a risk management environment.

13. The computer-implemented method of claim 8 wherein the underlying risk vehicle is managed for the purposes of capital allocation within economic entities.

14. The computer-implemented method of claim 1, wherein the underlying risk vehicle or any of the assets and liabilities comprising the underlying risk vehicle is underwritten.

15. The computer-implemented method of claim 14 wherein the underwritten underlying risk vehicle or any of the underwritten assets and liabilities comprising the underlying risk vehicle are selected from the group consisting of:
   a) insurance liabilities and reinsurance contracts,
   b) insurance-linked contracts, and catastrophe bonds,
   c) credit instruments, including loans, leases, mortgages, and credit cards,
   d) account payables and receivables.

16. The computer-implemented method of claim 15 wherein securitizations are backed by the assets and liabilities of the underlying risk vehicle.

17. The computer-implemented method of claim 15 wherein derivatives, contingent claims, and payoff functions, are based on an underlying risk vehicle.

18. The computer-implemented method of claim 15 wherein the underwritten risk vehicle comprises part or the whole of the basis of a published benchmark, index, or collective experience.

19. The computer-implemented method of claim 15 wherein the underlying risk vehicle is managed in a portfolio, and within a risk management environment.

20. The computer-implemented method of claim 15 wherein the underlying risk vehicle is measured for the purposes of capital allocation within economic entities.

21. The computer-implemented method of claim 15 wherein the underlying risk vehicle is measured for cost of capital within economic entities.

22. A computer-readable medium for computing in a computer and outputting an indicated price, with adjustment for risk, and adjustment for parameter uncertainty, of anticipated contract obligations having stored thereon data representing sequences of instructions, which when executed by a computer, cause the computer to perform the steps comprising:
   a) identifying an underlying risk vehicle comprised of a group of one or more assets and liabilities,
   b) assembling a series of potential future cashflow outcomes, consisting of cashflow values linked to their respectively paired probabilities, as a future probability distribution for the underlying risk vehicle,
   c) sorting the series of outcomes by their ascending cashflow values from the lowest listed as first to the highest listed as last, with those cashflow values still linked to their original respectively paired probabilities,
   d) cumulating the respectively paired probabilities of the sorted series of outcomes so that the last cumulated probability still linked to the highest cashflow equals 1,
   e) providing individual inversely-mapped results for those probabilities, by applying the inversion of the standard normal distribution to all of the cumulated probabilities,
   f) selecting a lambda value equal to the market price of risk for the overall future probability distribution of the underlying risk vehicle,
   g) adding the selected lambda value to obtain a shifted inversely-mapped result,
   h) creating transformed cumulative probability weights by applying a Student-t cumulative distribution to each shifted result,
   i) decumulating the transformed cumulative probability weights of the sorted series of outcomes so that the first decumulated weight equals its own cumulated weight, the second decumulated weight equals the second cumulated weight minus the first cumulated weight, the third decumulated weight equals the third cumulated weight minus the second cumulative weight, and so on, continuing until the last decumulated weight equals the last cumulated weight minus the next-to-last cumulated weight, j) producing a set of weighted values by multiplying the cashflow values to their respective decumulated probability weights, and k) computing and outputting an undiscounted future indicated price for the underlying risk vehicle by adding the weighted values in the set.

23. The computer-readable medium for use with a computer means of claim 22, further comprising the application of discounting the undiscounted price by the risk-free interest rate.

24. The computer-readable medium for use with a computer means of claim 22, further comprising the step of iterating the lambda value, so that the undiscounted price is discounted by the risk-free interest rate, and converges to the last recorded outcome or quoted price, of that same underlying risk vehicle.

25. The computer-readable medium for use with a computer means of claim 22, further comprising the step of iterating the number of degrees of freedom for the Student-t distribution, so that the undiscounted price is discounted by the risk-free interest rate, and converges to the last recorded outcome or quoted price, of that same underlying risk vehicle.

26. The computer-readable medium for use with a computer means of claim 22, further comprising the steps, of first, iterating the lambda value, and, of second, iterating the number of degrees of freedom for the Student-t distribution, in a sequence selected from the stoup consisting of:

a) the first is iterated and fixed before the second is further iterated, b) the second is iterated and fixed before the first is further iterated, c) the first and second are iterated consecutively, d) the first and second are iterated simultaneously.

27. The computer-readable medium for use with a computer means of claim 22, applying a payoff function to each projected outcome of an underlying risk vehicle, comprising the additional steps of:

a) applying the payoff function to each projected outcome of the underlying risk vehicle, b) multiplying the resulting payoff values by their respective decumulated probability weights to produce a set of weighted values, c) adding these weighted values in the set to find an undiscounted price for the payoff function, d) discounting the undiscounted price by the risk-free interest rate.

28. The computer-readable medium for use with a computer means of claim 22, wherein the underlying risk vehicle is traded.

29. The computer-readable medium for use with a computer means of claim 28, wherein the assets and liabilities comprising the underlying risk vehicle are selected from the group consisting of:

a) stocks or other equity securities, b) bills, bonds, notes, or other debt securities, c) currencies of various countries, d) commodities of physical, agricultural, or financial delivery, e) asset-backed or liability-linked securities or contractual obligations, f) weather derivatives and other observable physical phenomena whose outcomes can be linked to financial outcomes.

30. The computer-readable medium for use with a computer means of claim 29 wherein securitizations are backed by the assets and liabilities.

31. The computer-readable medium for use with a computer means of claim 29 wherein derivatives, contingent claims, and payoff functions, are based on the as underlying financial instrument.

32. The computer-readable medium for use with a computer means of claim 29 wherein the underlying risk vehicle comprises part or the whole of the basis of published benchmark, index, or collective experience.

33. The computer-readable medium for use with a computer means of claim 29 wherein the underlying risk vehicle is managed in a portfolio, and in a risk management environment.

34. The computer-readable medium for use with a computer means of claim 29 wherein the underlying risk vehicle is managed for the purposes of capital allocation within economic entities.

35. The computer-readable medium for use with a computer means of claim 22, wherein the underlying risk vehicle, or any of the assets and liabilities comprising the underlying risk vehicle, is underwritten.

36. The computer-readable medium for use with a computer means of claim 35 wherein the underwritten underlying risk vehicle, or any of the underwritten assets and liabilities comprising the underlying risk vehicle, are selected from the group consisting of:

a) insurance liabilities and reinsurance contracts, b) insurance-linked contracts, and catastrophe bonds, c) credit instruments, loans, leases, mortgages, and credit cards, d) account payables and receivables.

37. The computer-readable medium for use with a computer means of claim 36 wherein securitizations are backed by the assets and liabilities of the underlying risk vehicle.

38. The computer-readable medium for use with a computer means of claim 36 wherein derivatives, contingent claims, and payoff functions, are based on the underlying risk vehicle.

39. The computer-readable medium for use with a computer means of claim 36 wherein the underwritten risk vehicle comprises part or the whole of the basis of published benchmark, index, or collective experience.

40. The computer-readable medium for use with a computer means of claim 36 wherein the underlying risk vehicle is managed in a portfolio, within a risk management environment.

41. The computer-readable medium for use with a computer means of claim 36 wherein the underlying risk vehicle is measured for the purposes of capital allocation within economic entities.

42. The computer-readable medium for use with a computer means of claim 36 wherein the underlying risk vehicle is measured for cost of capital within economic entities.

* * * * *

UNITED STATES PATENT AND TRADEMARK OFFICE
CERTIFICATE OF CORRECTION

PATENT NO.       : 7,752,126 B2
APPLICATION NO.  : 11/928985
DATED            : July 6, 2010
INVENTOR(S)      : Shaun S. Wang It is certified that error appears in the above-identified patent and that said Letters Patent is hereby corrected as shown below:

In col. 1, l. 27, please replace "historically-known of computer-generated" with the following:
--historically-known or computer-generated--

In col. 23, l. 60, please replace "expression of (NORMINV(COLUMN 9C,0,1)), and" with the following:
--expression of (NORMINV(COLUMN_9C,0,1)), and--

In col. 23, l. 63, please replace "added to the (NORMINV(COLUMN 9C,0,1))." with the following:
--added to the (NORMINV(COLUMN_9C,0,1)).--

In col. 26, l. 15, please replace "payout of $2741.83 for a" with the following:
--payout of $271.83 for a--

In col. 33, ll. 48–55, please delete in its entirety the paragraph beginning "Table 7 provides the series ...."

In col. 34, l. 33, please replace "at $1.46. This" with the following:
--at $1.96. This--

In col. 39, l. 32, please replace "from the stoup consisting" with the following:
--from the group consisting--

In col. 40, l. 11, please replace "based on the as underlying" with the following:
--based on the underlying--

Signed and Sealed this

Sixteenth Day of November, 2010

David J. Kappos
*Director of the United States Patent and Trademark Office*